(12) United States Patent
Matsumura et al.

(10) Patent No.: US 11,762,497 B2
(45) Date of Patent: Sep. 19, 2023

(54) DISPLAY DEVICE

(71) Applicant: Japan Display Inc., Tokyo (JP)

(72) Inventors: Kazune Matsumura, Tokyo (JP); Seiichi Uramoto, Tokyo (JP); Gen Koide, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/851,101

(22) Filed: Jun. 28, 2022

(65) Prior Publication Data

US 2023/0004055 A1    Jan. 5, 2023

(30) Foreign Application Priority Data

Jun. 30, 2021 (JP) ................................. 2021-109117

(51) Int. Cl.
*G06F 3/041* (2006.01)
*G02F 1/1362* (2006.01)
*G02F 1/1333* (2006.01)
*G06F 3/044* (2006.01)
*G02F 1/1368* (2006.01)

(52) U.S. Cl.
CPC ........ *G06F 3/04164* (2019.05); *G02F 1/1368* (2013.01); *G02F 1/13338* (2013.01); *G02F 1/136286* (2013.01); *G06F 3/0412* (2013.01); *G06F 3/0443* (2019.05)

(58) Field of Classification Search
CPC ......... G06F 3/041–0412; G06F 3/0443; G06F 3/04164; G06F 2203/041–04114; G02F 1/136286; G02F 1/13629; H10K 50/844; H10K 59/40; H10K 59/131; H10K 50/84; H10K 59/12
See application file for complete search history.

(56) References Cited

U.S. PATENT DOCUMENTS 10,777,584 B2   9/2020  Yamamoto et al.
11,119,372 B2   9/2021  Yamamoto et al.

FOREIGN PATENT DOCUMENTS

JP   2018-132606 A   8/2018
JP   2019-39985 A    3/2019

*Primary Examiner* — Sanjiv D. Patel
(74) *Attorney, Agent, or Firm* — XSENSUS LLP

(57) ABSTRACT

A peripheral wiring region of a display device includes a first insulating layer on a substrate, a first wiring layer on the first insulating layer, a second insulating layer which is present on the first insulating layer and covers the first wiring layer, and a second wiring layer on the second insulating layer. A plurality of video signal wirings are arranged in the first wiring layer. A plurality of touch detection wirings arranged in a matrix in an X direction and a Y direction and a conductor pattern to which a fixed potential is supplied are formed in the second wiring layer. The conductor pattern is arranged at a position overlapping a part of the plurality of video signal wirings and is capacitively coupled to the part of the plurality of video signal wirings.

13 Claims, 15 Drawing Sheets

DISPLAY DEVICE

CROSS-REFERENCE TO RELATED APPLICATION

The present application claims priority to Japanese Patent Application No. 2021-109117 filed on Jun. 30, 2021, the disclosure of which is incorporated herein by reference.

TECHNICAL FIELD OF THE INVENTION

The present invention relates to a technology for a display device.

BACKGROUND OF THE INVENTION

Patent Document 1 (Japanese Unexamined Patent Application Publication No. 2018-132606) describes a structure in which a mesh-shaped shield portion is arranged above a sensor feed line, as a measure against noise due to high-frequency pulses for touch sensing. Further, Patent Document 2 (Japanese Unexamined Patent Application Publication No. 2019-39985) describes a structure in which a shield layer made of the same material as a transparent electrode is arranged in the upper layer of a plurality of connection lines connected to a signal selection circuit.

SUMMARY OF THE INVENTION

Display devices are applied to portable terminal devices having a wireless communication function with an external device in some cases. In the case of a display device having a wireless communication function, if electromagnetic waves generated with the switching operation for inputting signals for a display function interfere with the band of the wireless communication, they become the noise for the wireless communication. Therefore, a technology for suppressing the generation of electromagnetic waves as a noise source is required.

An object of the present invention is to provide a technology capable of improving the performance of the display device.

Means for Solving the Problem

A display device according to an aspect of the present invention includes: a first substrate having a first side extending in a first direction and a second side opposite to the first side in a second direction perpendicular to the first direction; a display region between the first side and the second side in the second direction; a plurality of touch detection electrodes arranged in a matrix in the first direction and the second direction in the display region; a switch circuit region which is present between the first side and the display region in the second direction and in which a signal selection circuit is arranged; a peripheral wiring region which is present between the first side and the switch circuit region in the second direction and in which a plurality of peripheral wirings including a plurality of video signal wirings connected to the signal selection circuit and a plurality of touch detection wirings connected to the plurality of touch detection electrodes are arranged; and a terminal region which is present between the first side and the peripheral wiring region in the second direction and in which a plurality of terminals electrically connected to the plurality of peripheral wirings are arranged. The peripheral wiring region includes: a first insulating layer on the first substrate; a first wiring layer on the first insulating layer; a second insulating layer which is present on the first insulating layer and covers the first wiring layer; and a second wiring layer on the second insulating layer. The plurality of video signal wirings are arranged in the first wiring layer. The plurality of touch detection wirings and a conductor pattern to which a first potential is supplied are formed in the second wiring layer. The conductor pattern is arranged at a position overlapping a part of the plurality of video signal wirings, and is capacitively coupled to the part of the plurality of video signal wirings. The plurality of touch detection electrodes are formed on the second insulating layer in the display region.

BRIEF DESCRIPTIONS OF THE DRAWINGS

DESCRIPTIONS OF THE PREFERRED EMBODIMENTS

Figure 1:
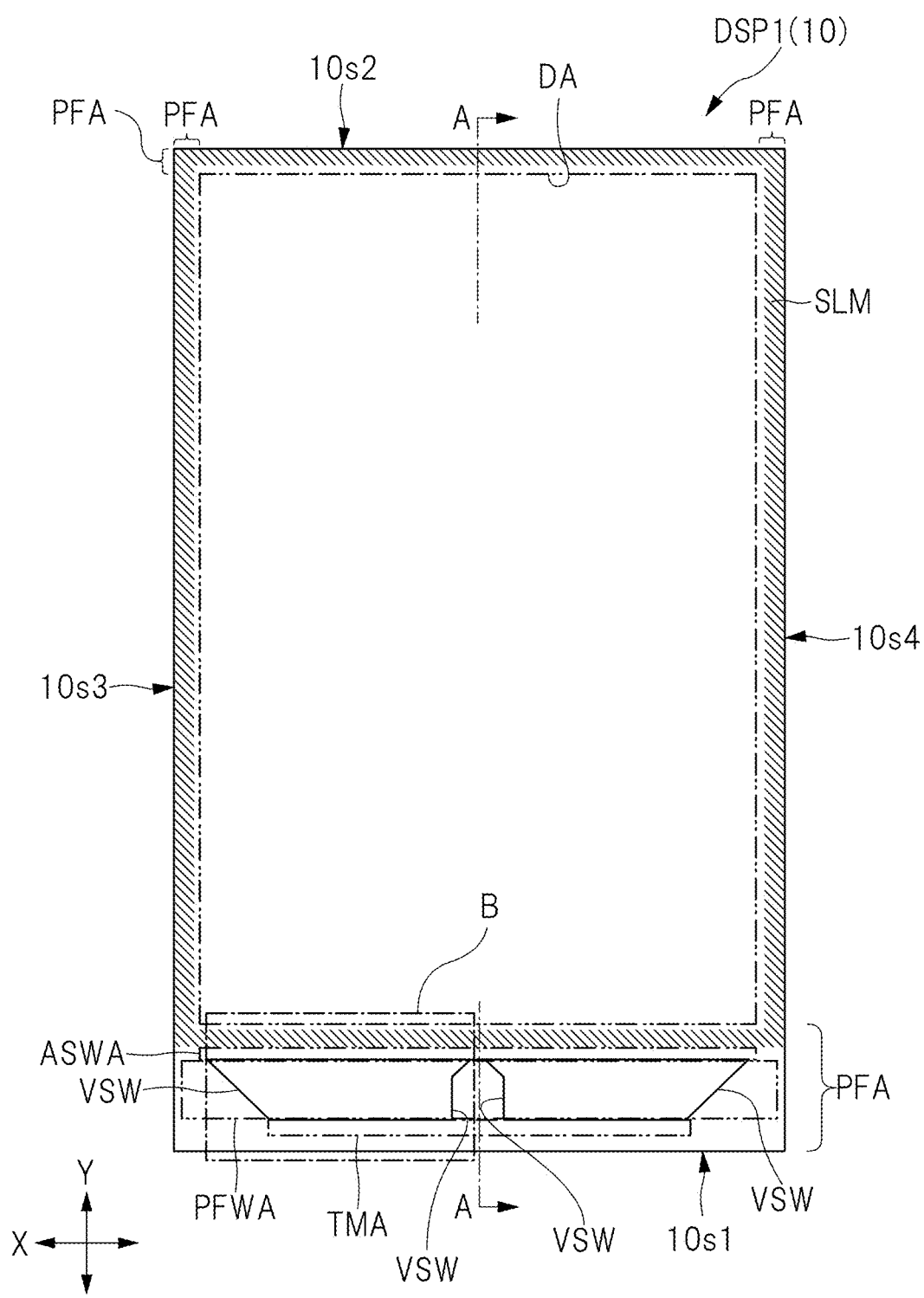
FIG. 1 is a plan view of a display surface side showing an example of a display device according to an embodiment.

Hereinafter, an embodiment of the present invention will be described with reference to drawings. Note that the disclosure is mere an example, and it is a matter of course that any alteration that is easily made by a person skilled in the art while keeping a gist of the present invention is included in the range of the present invention. In addition, the drawings schematically illustrate a width, a thickness, a shape, and the like of each portion as compared to actual aspects in order to make the description clearer, but the drawings are mere examples and do not limit the interpretation of the present invention. Further, the same or related reference characters are applied to the same elements as those described in relation to the foregoing drawings in the present specification and the respective drawings, and detailed descriptions thereof will be appropriately omitted in some cases.

In the following embodiment, a liquid crystal display device having a liquid crystal layer which is an electro-optical layer will be described as an example of a display device. However, the technology described below can be applied to various modifications in addition to the liquid crystal display device. For example, in addition to the liquid crystal layer, any layer such as an organic light-emitting element layer, an inorganic light-emitting element layer including micro LEDs, a MEMS (Micro Electro Mechanical Systems) shutter, an electrophoretic element layer, or the like may be applied as the electro-optical layer as long as it includes an element whose optical properties are changed by applying electric energy.

In addition, the liquid crystal display device is roughly classified into the following two types according to the application direction of an electric field for changing the orientation of liquid crystal molecules of a liquid crystal layer. Namely, as a first classification, the so-called longitudinal electric field mode in which an electric field is applied in the thickness direction of the display device (or out-of-plane direction) can be presented. The longitudinal electric field mode includes, for example, a TN (Twisted Nematic) mode and a VA (Vertical Alignment) mode. Also, as a second classification, the so-called transverse electric field mode in which an electric field is applied in the planar direction of the display device (or in-plane direction) can be presented. The transverse electric field mode includes, for example, an IPS (In-Plane Switching) mode and an FFS (Fringe Field Switching) mode which is one of the IPS modes. The technology described below can be applied to both the longitudinal electric field mode and the transverse electric field mode, but a display device of the transverse electric field mode will be described as an example in the embodiment described below.

<Configuration of Display Device>

Figure 2:
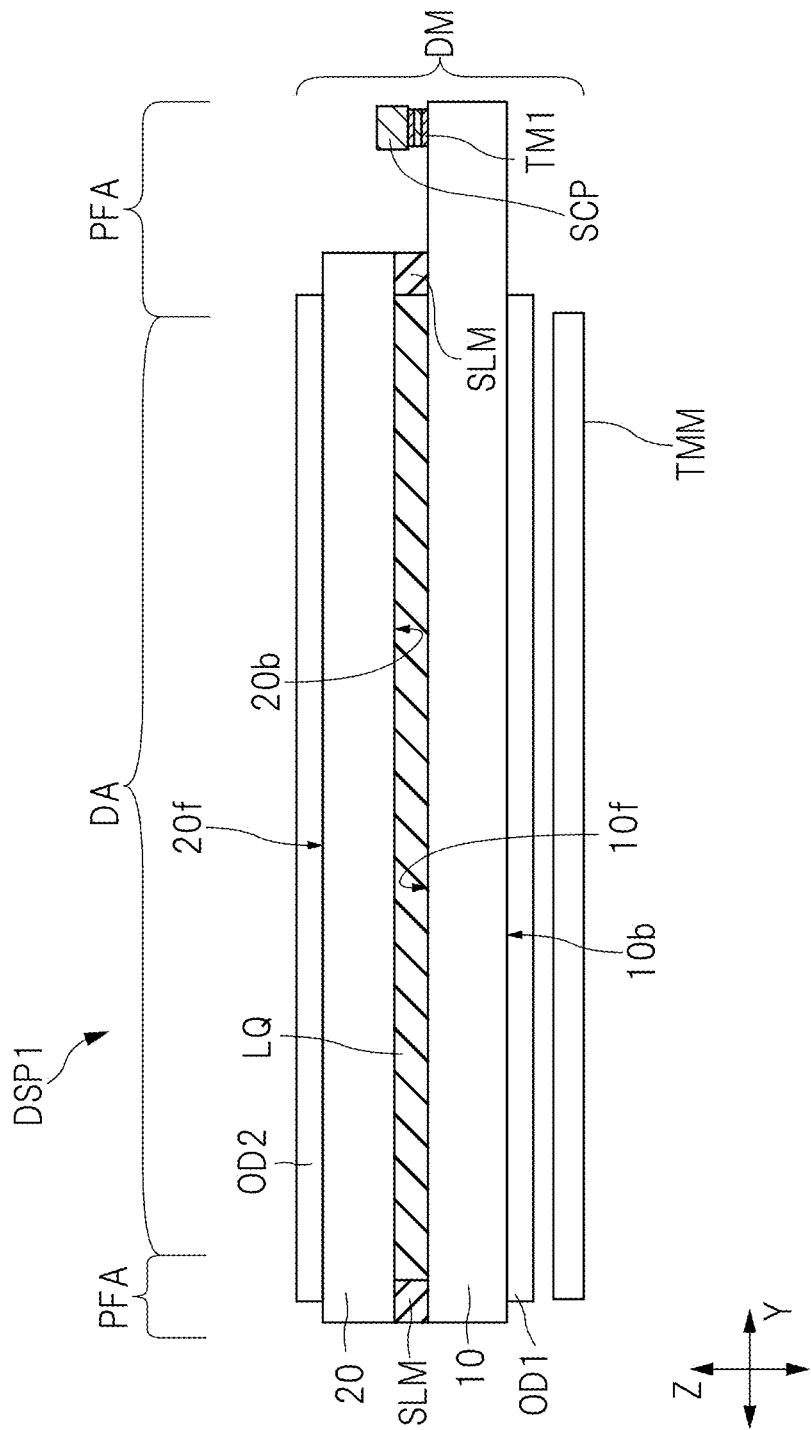
FIG. 2 is a cross-sectional view taken along the line A-A in FIG. 1.
Figure 3:
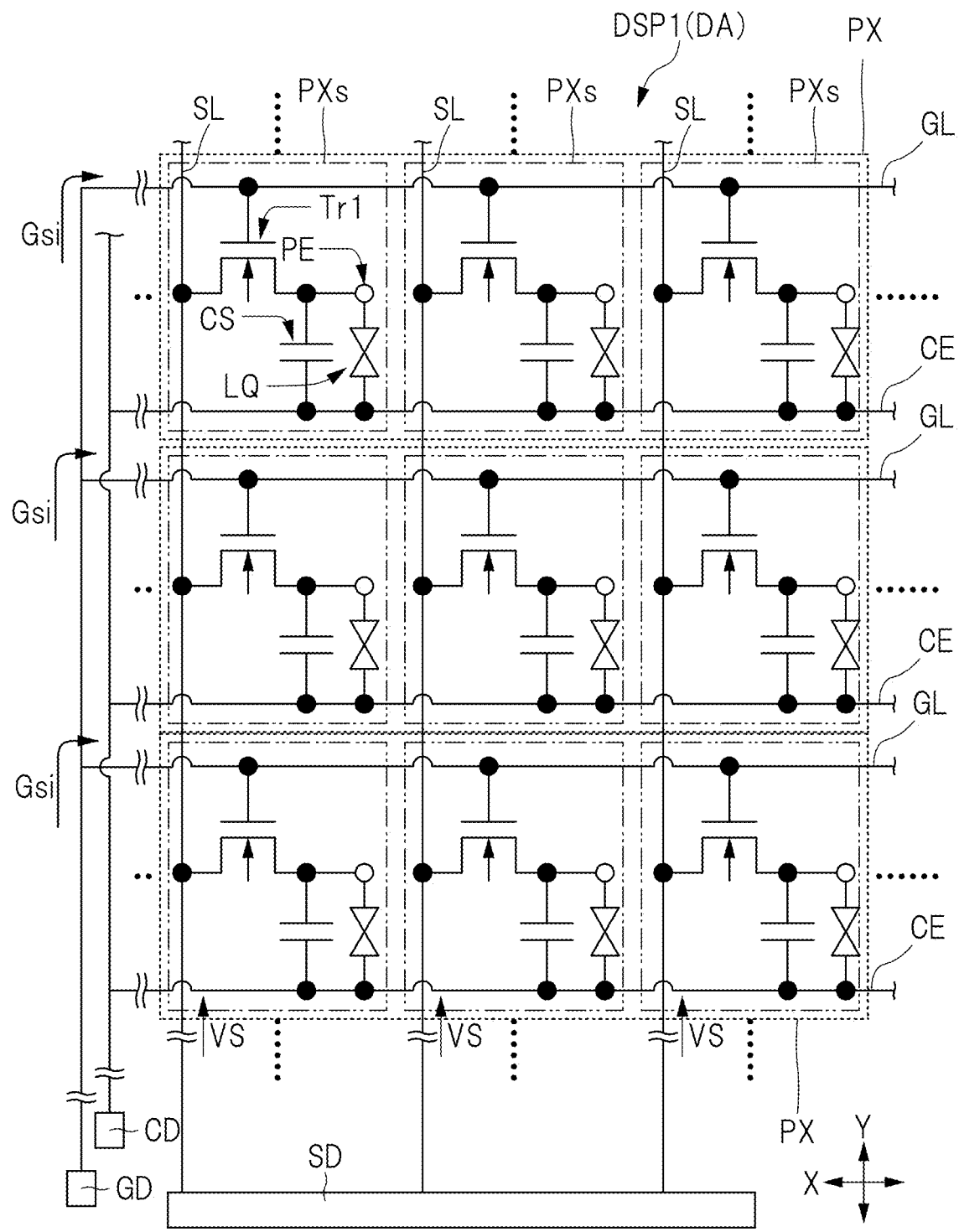
FIG. 3 is a circuit diagram showing a circuit configuration example around a pixel provided in the display device shown in FIG. 1.
Figure 4:
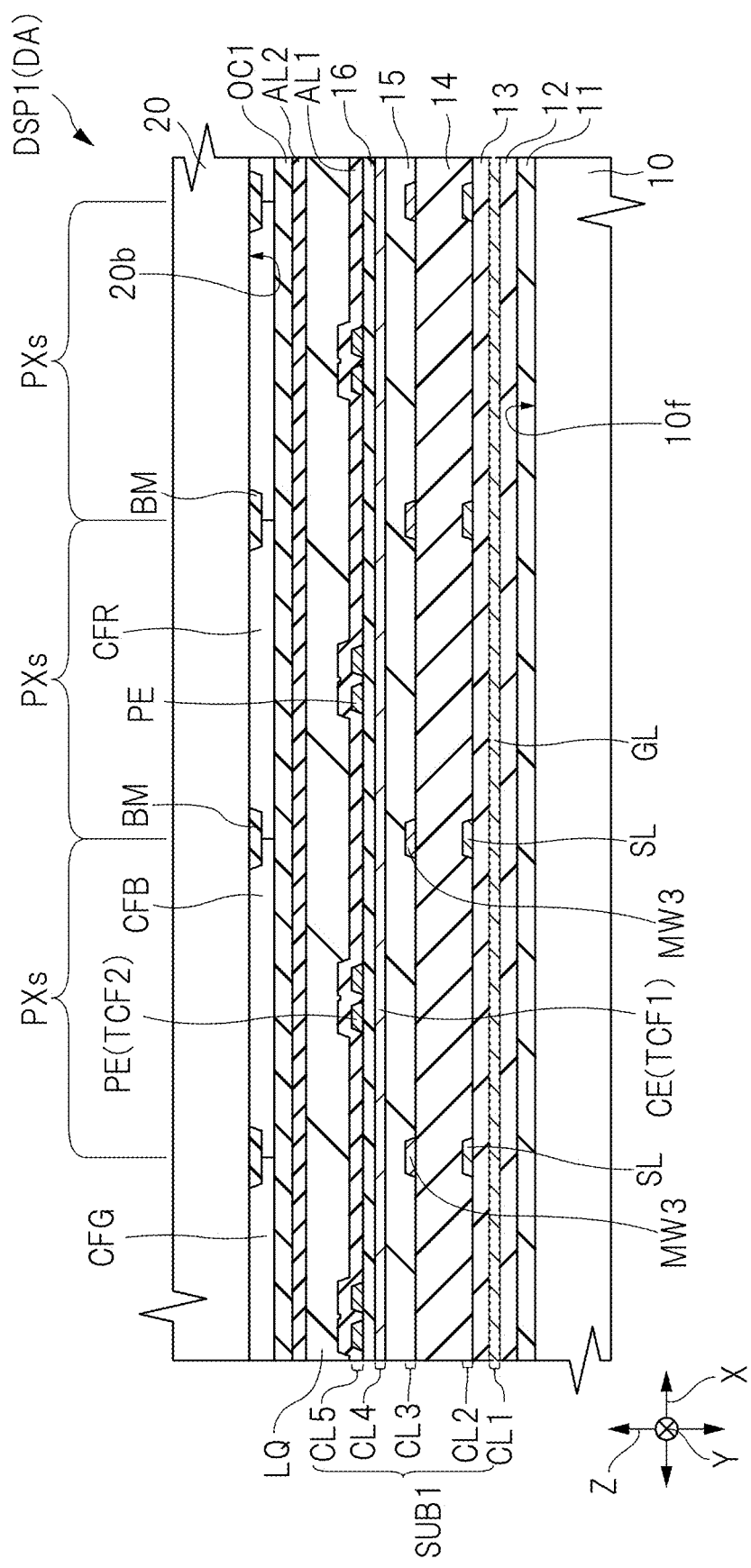
FIG. 4 is an enlarged cross-sectional view of a display region of the display device shown in FIG. 2.

First, a configuration of a display device will be described. FIG. 1 is a plan view of a display surface side showing an example of a display device according to an embodiment. In FIG. 1, each of the boundary between a display region DA and a peripheral region PFA, a switch circuit region ASWA, a peripheral wiring region PFWA, and a terminal region TMA is shown by an alternate long and two short dashes line. Also, in FIG. 1, the hatching is applied to the region where a sealing material SLM is arranged. Further, in FIG. 1, among the large number of video signal wirings VSW, four video signal wirings VSW arranged at the end of the video signal wiring group are illustrated representatively. FIG. 2 is a cross-sectional view taken along the line A-A in FIG. 1. As shown in FIG. 4 to be described later, there are a plurality of conductive layers and insulating layers between a substrate 10 and a substrate 20, in addition to the liquid crystal layer LQ, but they are omitted in FIG. 2. FIG. 3 is a circuit diagram showing a circuit configuration example around a pixel provided in the display region of the display device shown in FIG. 1. FIG. 4 is an enlarged cross-sectional view of the display region of the display device shown in FIG. 2. In FIG. 4, in order to show an example of the positional relationship between a scanning signal line GL and a video signal line SL in the thickness direction of the substrate 10 (Z direction shown in FIG. 4), the scanning signal line GL provided in a different cross-section from FIG. 4 is illustrated by a dotted line.

As shown in FIG. 1, a display device DSP1 of the present embodiment includes the substrate 10, the display region DA, the switch circuit region ASWA, the peripheral wiring region PFWA, and the terminal region TMA. The substrate 10 has a side $10s1$ extending in the X direction (first direction) and a side $10s2$ on the opposite side of the side $10s1$ in the Y direction (second direction) perpendicular to the X direction. In addition, the substrate 10 has a side $10s3$ extending in the Y direction and a side $10s4$ on the opposite side of the side $10s3$ in the X direction.

The display region DA is present between the side $10s1$ and the side $10s2$ in the Y direction. In the display region DA, an image is formed in accordance with an input signal supplied from the outside. The display region DA is an effective region where the display device DSP1 displays an image in a plan view showing the display surface. Also, the display device DSP1 has the peripheral region (non-display region) PFA around the display region DA in plan view. In the example shown in FIG. 1, the peripheral region PFA is arranged between the side $10s2$ and the display region DA, between the side $10s3$ and the display region DA, and between the side $10s4$ and the display region DA. However, as a modification, the display region DA may extend to the peripheral edge of the substrate 10 instead of providing the peripheral region PFA between the side $10s2$ and the display region DA, between the side $10s3$ and the display region DA, and between the side $10s4$ and the display region DA.

The switch circuit region ASWA is present between the side $10s1$ and the display region DA in the Y direction. A signal selection circuit ASW composed of a plurality of switching elements (see FIG. 6 to be described later) is arranged in the switch circuit region ASWA. Details of the signal selection circuit ASW will be described later.

The peripheral wiring region PFWA is present between the side $10s1$ and the switch circuit region ASWA in the Y direction. A plurality of peripheral wirings including a plurality of video signal wirings connected to the signal selection circuit and a plurality of touch detection wirings connected to a plurality of touch detection electrodes are arranged in the switch circuit region PFWA. Details of the video signal wiring and the touch detection wiring will be described later.

The terminal region TMA is present between the side $10s1$ and the peripheral wiring region PFWA in the Y direction. A plurality of terminals TM1 (see FIG. 2) which are electrically connected to a plurality of peripheral wirings are arranged in the terminal region TMA. The plurality of terminals TM1 arranged in the terminal region TMA are electrically connected to the control circuit for controlling the video signal VS (see FIG. 3) and the drive signal. In the example shown in FIG. 2, a semiconductor device SCP is mounted on the terminal TM1, and the control circuit for controlling the video signal and the drive signal is formed in the semiconductor device SCP. As an example, the semiconductor device SCP is an external drive circuit such as a driver IC chip. Alternatively, as a modification, the semiconductor device SCP may be formed on a flexible wiring board (not shown), the terminal TM1 may be connected to the terminal of the flexible wiring board, and the terminal TM1 may be connected to a control circuit for controlling the video signal and the drive signal (scanning drive circuit GD, video signal drive circuit SD, and common potential supply circuit CD shown in FIG. 3) via the flexible wiring board.

As shown in FIG. 2, the display device DSP1 includes the substrate 10 and the substrate 20 bonded so as to face each other with interposing a liquid crystal layer LQ therebetween. The substrate 10 and the substrate 20 face each other in the thickness direction (Z direction) of the display device DSP1. The substrate 10 has a front surface 10f facing the liquid crystal layer LQ (and the substrate 20). The substrate 10 has a back surface 10b on the opposite side of the front surface 10f. Further, the substrate 20 has a back surface 20b facing the front surface 10f of the substrate 10 (and the liquid crystal layer LQ). The substrate 20 has a front surface 20f on the opposite side of the back surface 20b. The substrate 10 is an array substrate in which a plurality of transistors (transistor elements) as switching elements (active elements) (see FIG. 3) are arranged in an array. Also, the substrate 20 is a substrate provided on the display surface side. The substrate 20 can be restated as a counter substrate in the sense that it is a substrate arranged so as to face the array substrate.

The liquid crystal layer LQ is located between the front surface 10f of the substrate 10 and the back surface 20b of the substrate 20. The liquid crystal layer LQ is an electro-optical layer for controlling the transmission state of visible light. It has a function of modulating the light passing therethrough by controlling the state of the electric field formed around the liquid crystal layer LQ via the switching element. The display region DA on the substrate 10 and the substrate 20 is superimposed on the liquid crystal layer LQ as shown in FIG. 2.

Further, the substrate 10 and the substrate 20 are adhered to each other via a sealing material (adhesive material) SLM. As shown in FIG. 1, the sealing material SLM is arranged in the peripheral region PFA so as to surround the display region DA. The liquid crystal layer LQ is present inside the sealing material SLM as shown in FIG. 2. The sealing material SLM serves as a seal for enclosing the liquid crystal between the substrate 10 and the substrate 20. Further, the sealing material SLM serves as an adhesive material for adhering the substrate 10 and the substrate 20.

Also, the display device DSP1 includes an optical element OD1 and an optical element OD2. The optical element OD1 is arranged on the side with the back surface 10b of the substrate 10. The optical element OD2 is arranged on the side with the front surface 20f of the substrate 20, in other words, on the side with the display surface. Each of the optical element OD1 and the optical element OD2 includes at least a polarizing plate, and may include a retardation plate as required. Although not shown, the display device DSP1 includes a light source unit. For example, the light source unit is arranged on the back surface side of the optical element OD1 (the position on the opposite side of the substrate 10) or in the peripheral region PFA on the substrate 10.

Each of the substrate 10 and the substrate 20 is a transparent plate material having visible light transmission properties (properties of transmitting visible light). As an example of a substrate which is a transparent plate material, a glass substrate can be presented. Further, as a constituent material of the substrate 10 and the substrate 20, a resin material containing a polymer such as polyimide, polyamide, polycarbonate, or polyester (resin material having visible light transmission properties) can also be used. In the case of the substrate made of a resin material such as polyimide, the substrate has flexibility. If the substrate 10 has flexibility, a part of the substrate 10 (for example, the peripheral region PFA) can be curved or folded. If the substrate 10 and the substrate 20 have flexibility, it is possible to reduce the area of the peripheral region PFA in plan view. In this case, it is possible to increase the occupancy of the effective display region in plan view.

As shown in FIG. 3, a plurality of pixels PX are arranged in the display region DA. In the example shown in FIG. 3, each of the plurality of pixels PX has a plurality of sub-pixels PXs. For example, the plurality of sub-pixels PXs include a sub-pixel PXs for red, a sub-pixel PXs for blue, and a sub-pixel PXs for green, and it is possible to display a color image by controlling the color tone of the plurality of sub-pixels PXs. As the number of types of the sub-pixels PXs constituting one pixel PX, various modifications can be applied other than the three types shown in FIG. 3.

Each of the plurality of sub-pixels PXs includes a transistor Tr1 which is a switching element for controlling the on-off of the electric field applied to the liquid crystal layer LQ. The transistor Tr1 controls the operation of the sub-pixel PXs. The transistor Tr1 is a thin film transistor (TFT) formed on the substrate 10 as will be described later.

Further, as shown in FIG. 3, the display device DSP1 includes a plurality of scanning signal lines GL extending in the X direction in the display region DA and a plurality of video signal lines SL extending in the Y direction intersecting the X direction (perpendicular to the X direction in FIG. 3) in the display region DA. The scanning signal line GL is a gate line that is connected to the gate of the transistor Tr1. Also, the video signal line SL is a source line that is connected to the source of the transistor Tr1. In addition, each of the plurality of scanning signal lines GL extends in the X direction and is arranged at equal intervals in the Y direction, for example. Each of the plurality of video signal lines SL extends in the Y direction and is arranged at equal intervals in the X direction, for example.

Each of the plurality of scanning signal lines GL is connected to a scanning drive circuit (gate drive circuit) GD. The scanning signal Gsi output from the scanning drive circuit GD is input to the gate of the transistor Tr1 via the scanning signal line GL. Further, each of the plurality of video signal lines SL is connected to the video signal drive circuit SD. The video signal VS output from the video signal drive circuit SD is input to the source of the transistor Tr1 via the video signal line SL. For example, the scanning drive circuit GD and the video signal drive circuit SD are provided in the semiconductor device SCP shown in FIG. 2. Alternatively, as a modification, the video signal drive circuit SD may be formed on the substrate 10 shown in FIG. 1.

Each of the plurality of video signal lines SL is connected to a pixel electrode PE via the transistor Tr1. Specifically, the video signal line SL is connected to the source of the transistor Tr1 and the pixel electrode PE is connected to the drain of the transistor Tr1. When the transistor Tr1 is turned on, the video signal VS is supplied from the video signal line SL to the pixel electrode PE. Further, the pixel electrode PE is connected to the electrode CE via a dielectric layer (capacitive element CS shown in FIG. 3). In the display period for displaying an image on the display region DA, a fixed potential is supplied from the common potential supply circuit CD to each of the plurality of electrodes CE as a common electrode. The fixed potential supplied to the electrode CE is a potential common to the plurality of sub-pixels PXs (hereinafter, referred to as common potential). In the display period, an electric field is formed in each sub-pixel PXs in accordance with the potential difference between the common potential supplied to the electrode CE and the potential supplied to the pixel electrode PE, and the liquid crystal molecules in the liquid crystal layer LQ are driven by the electric field.

Each of the scanning drive circuit GD, the video signal drive circuit SD, and the common potential supply circuit CD shown in FIG. 3 is drawn by the wiring to the terminal region TMA shown in FIG. 1, and is electrically connected to the semiconductor device SCP.

As shown in FIG. 4, a plurality of conductive layers CL1 to CL5, a plurality of insulating films 11 to 16, and an alignment film AL1 are provided between the substrate 10 and the liquid crystal layer LQ. The plurality of conductive layers CL1 to CL5, the plurality of insulating films 11 to 16, and the alignment film AL1 are formed on the front surface 10f of the substrate 10. Also, a light shielding film BM, color filters CFR, CFG, and CFB, an insulating film OC1, and an alignment film AL2 are provided between the substrate 20 and the liquid crystal layer LQ. The light shielding film BM, the color filters CFR, CFG, and CFB, the insulating film OC1, and the alignment film AL2 are formed on the back surface 20b of the substrate 20.

A metal conductor pattern (metal wiring) with the light-shielding properties is formed in each of the conductive layers CL1, CL2, and CL3 shown in FIG. 4. The conductive CL1 includes a metal film made of, for example, a metal such as molybdenum (Mo) or tungsten (W) or an alloy thereof. For example, the conductor pattern of the conductive layer CL2 and the conductive layer CL3 includes a metal film with a multilayer structure such as a stacked film in which an aluminum (Al) film is sandwiched between a titanium (Ti) film and a titanium nitride (TiN) film. Also, the conductive layer CL4 and the conductive layer CL5 mainly contain a conductive oxide material (transparent conductive materials) such as ITO (Indium tin oxide) or IZO (Indium Zinc Oxide). In this specification, a conductor film formed of a material having both the visible light transmission properties and conductivity, such as ITO or IZO, is referred to as a transparent conductive film.

Insulating films are interposed between the conductive layers CL1 to CL5. An insulating film 11 and an insulating film 12 are interposed between the conductive layer CL1 and the substrate 10. An insulating film 13 is interposed between the conductive layer CL1 and the conductive layer CL2. An insulating film 14 is interposed between the conductive layer CL3 and the conductive layer CL4. An insulating film 15 is interposed between the conductive layer CL4 and the conductive layer CL5. The alignment film AL1 is interposed between the conductive layer CL5 and the liquid crystal layer LQ. Each of the insulating films 11, 12, 13, and 16 is an inorganic insulating film. Examples of the inorganic insulating film include a silicon nitride (SiN) film, a silicon oxide (SiO) film, an aluminum oxide (AlOx) film, and a stacked film thereof. Also, the insulating films 14 and 15 are organic insulating films. By forming the insulating film made of an organic material to be thicker than the insulating film made of an inorganic material, the upper surface (front surface) can be planarized. The insulating film 14 and the insulating film 15 are used as planarization films for planarizing the unevenness of the conductor pattern formed in the underlying layer. Therefore, the thickness of the insulating film 14 and the thickness of the insulating film 15 are larger than those of the insulating films 11, 12, and 13 which are inorganic insulating films. Examples of the organic insulating film include an acrylic photosensitive resin film and the like.

Each of the plurality of scanning signal lines GL is formed in the conductive layer CL1 on the substrate 10. The insulating film 11 and the insulating film 12 are stacked on the substrate 10, and the scanning signal line GL is formed on the insulating film 12. Each of the plurality of video signal lines SL is formed in the conductive layer CL2 on the substrate 10. The insulating films 11, 12, and 13 are stacked on the substrate 10, and the video signal line SL is formed on the insulating film 13.

A semiconductor layer of the transistor (transistor element) Tr1 shown in FIG. 3 is formed between the insulating film 11 and the insulating film 12. Since the semiconductor layer is present in a different cross-section from FIG. 4, FIG. 4 does not show the semiconductor layer. The source region of the semiconductor layer is electrically connected to the video signal line SL formed in the conductive layer CL2. The drain region of the semiconductor layer is electrically connected to the pixel electrode PE of the conductive layer CL5. In plan view, the scanning signal line GL extends between the source region and the drain region of the semiconductor layer. Also, the scanning signal line GL overlaps the channel region of the semiconductor layer, and functions as a gate electrode of the transistor Tr1. The insulating film 12 interposed between the channel region and the scanning signal line GL functions as a gate insulating film. The TFT having the structure in which the gate electrode is arranged on the upper side of the channel region of the transistor Tr1 as in the above-described example is referred to as a top-gate type. However, there are various modifications of the TFT type, and a bottom-gate type in which the gate electrode is arranged on the lower side of the channel region may be used. Alternatively, there is also the type in which the gate electrodes are arranged on both the upper and lower sides of the channel region.

A wiring MW3 is arranged in the conductive layer CL3. The wiring MW3 is a metal wiring made of metal similarly to the scanning signal line GL and the video signal line SL. The wiring MW3 is arranged at a position overlapping the video signal line SL in the thickness direction (Z direction). The wiring MW3 is electrically connected to the electrode CE formed in the conductive layer CL4. In this case, the wiring MW3 can be utilized as a wiring for supplying a potential to the electrode CE. As will be described later, in the display device DSP1 as a touch panel, the electrode CE is used as a detection electrode that detects an input position (touch position) by utilizing a change in electrostatic capacitance. The wiring MW3 electrically connects the electrode CE for detecting the input position and the detection circuit. In this case, the wiring MW3 is used as a signal transmission path for transmitting a drive signal and a detection signal used for detecting the touch position.

The conductive layer CL4 includes a transparent conductive film TCF1 having visible light transmission properties and is present between the substrate 10 and the substrate 20. The electrode CE is formed in the conductive layer CL4. A plurality of transparent conductive films TCF1 formed in the conductive layer CL4 include the electrode CE. The electrode CE is formed on the insulating film 15, which is a planarization film, in the display region DA. The insulating film 15 corresponds to an insulating layer 32 shown in FIG. 7, which will be described later. Although FIG. 3 shows one electrode CE, a plurality of electrodes CE are arranged apart from each other in the display region DA shown in FIG. 1. As described above, the common potential is supplied to the electrode CE for the plurality of sub-pixels PXs. Therefore, as shown in FIG. 3, the electrode CE may be arranged over the plurality of sub-pixels PXs. In the case of the present embodiment, as described later, the electrode CE is used as a detection electrode for detecting the input position. Therefore, in the display region DA shown in FIG. 1, the plurality of electrodes CE are arranged apart from each other. The details of the layout of the electrodes CE in plan view will be described later.

The conductive layer CL5 includes a transparent conductive film TCF2 having visible light transmission properties and is present between the conductive layer CL4 and the substrate 20. A plurality of pixel electrodes PE are formed in the conductive layer CL5. The plurality of transparent conductive films TCF2 formed in the conductive layer CL5 include a plurality of pixel electrodes PE. The insulating film 16, which is an inorganic insulating film, is interposed between the conductive layer CL5 in which the pixel electrode PE is formed and the conductive layer CL4 in which the electrode CE is formed. The insulating film 16 functions as a dielectric layer, and the capacitive element CS shown in FIG. 3 is formed.

The plurality of pixel electrodes PE are covered with the alignment film AL1. The alignment film AL1 is an organic insulating film having a function of aligning an initial orientation of liquid crystal molecules contained in the liquid crystal layer LQ, and is made of, for example, a polyimide resin. Also, the alignment film AL1 is in contact with the liquid crystal layer LQ.

Further, as shown in FIG. 3, the light shielding film BM, the color filters CFR, CFG, and CFB, the insulating film OC1, and the alignment film AL2 are formed on the back surface (main surface, surface) 20b of the substrate 20.

The color filters CFR, CFG, and CFB are formed on the side with the rear surface 20b facing the substrate 10. In the example shown in FIG. 4, the color filters CFR, CFG, and CFB for three colors of red (R), green (G), and blue (B) are periodically arrayed. In the color display device, for example, a color image is displayed by using the pixels for three colors of red (R), green (G), and blue (B) as one set. The plurality of color filters CFR, CFG, and CFB of the substrate 20 are arranged at positions facing the respective pixels PX (see FIG. 1) having the pixel electrode PE formed on the substrate 10. The types of the color filters are not limited to the three colors of red (R), green (G), and blue (B).

Further, the light shielding film BM is arranged at the respective boundaries of the color filters CFR, CFG, and CFB for each color. The light shielding film BM is referred to as a black matrix, and is made of, for example, a black resin or a low reflection metal. For example, the light shielding film BM of the display region DA is formed in a lattice shape in plan view. In other words, the light shielding film BM extends in the X direction and the Y direction. More specifically, the light shielding film BM has a plurality of portions extending in the Y direction and a plurality of portions extending in the X direction intersecting the Y direction. By partitioning each pixel PX with the black matrix, it is possible to suppress light leakage and color mixing.

In the display region DA, the light shielding film BM is superimposed with the scanning signal line GL, the video signal line SL, and the wiring MW3 which are the metal wirings. Since the metal wiring having light shielding properties is arranged at a position overlapping the light shielding film BM, the metal wiring is difficult to be visually recognized on the display screen. On the other hand, at least a part of the electrode CE and the pixel electrode PE is arranged at the position where they do not overlap the light shielding film BM. The electrode CE and the pixel electrode PE are formed of a conductive material having visible light transmission properties. Therefore, although the electrode CE and the pixel electrode PE are arranged at the position where they do not overlap the light shielding film BM, visible light is not shielded by the electrode CE and the pixel electrode PE in each sub-pixel PXs.

Also, the light shielding film BM is formed also in the peripheral region PFA (see FIG. 1) of the substrate 20. The peripheral region PFA is superimposed on the light shielding film BM. The display region DA is defined as a region on an inner side of the peripheral region PFA. Further, the peripheral region PFA is a region superimposed on the light shielding film BM that shields the light emitted from the backlight unit (light source, not shown). The light shielding film BM is formed also in the display region DA, and a plurality of openings are formed in the light shielding film BM in the display region DA. Generally, among the openings which are formed in the light shielding film BM and from which the color filter is exposed, the end portion of the opening formed on the side closest to the peripheral edge portion is defined as the boundary between the display region DA and the peripheral region PFA.

The insulating film OC1 shown in FIG. 4 covers the color filters CFR, CFG, and CFB. The insulating film OC1 functions as a protective film for preventing the impurity diffusion from the color filters to the liquid crystal layer. The insulating film OC1 is an organic insulating film made of, for example, an acrylic photosensitive resin or the like.

The insulating film OC1 is covered with the alignment film AL2. The alignment film AL2 is an organic insulating film having a function of aligning an initial orientation of liquid crystal molecules contained in the liquid crystal layer LQ, and is made of, for example, a polyimide resin. Also, the alignment film AL2 is in contact with the liquid crystal layer LQ.

<Touch Panel Function>

Figure 5:
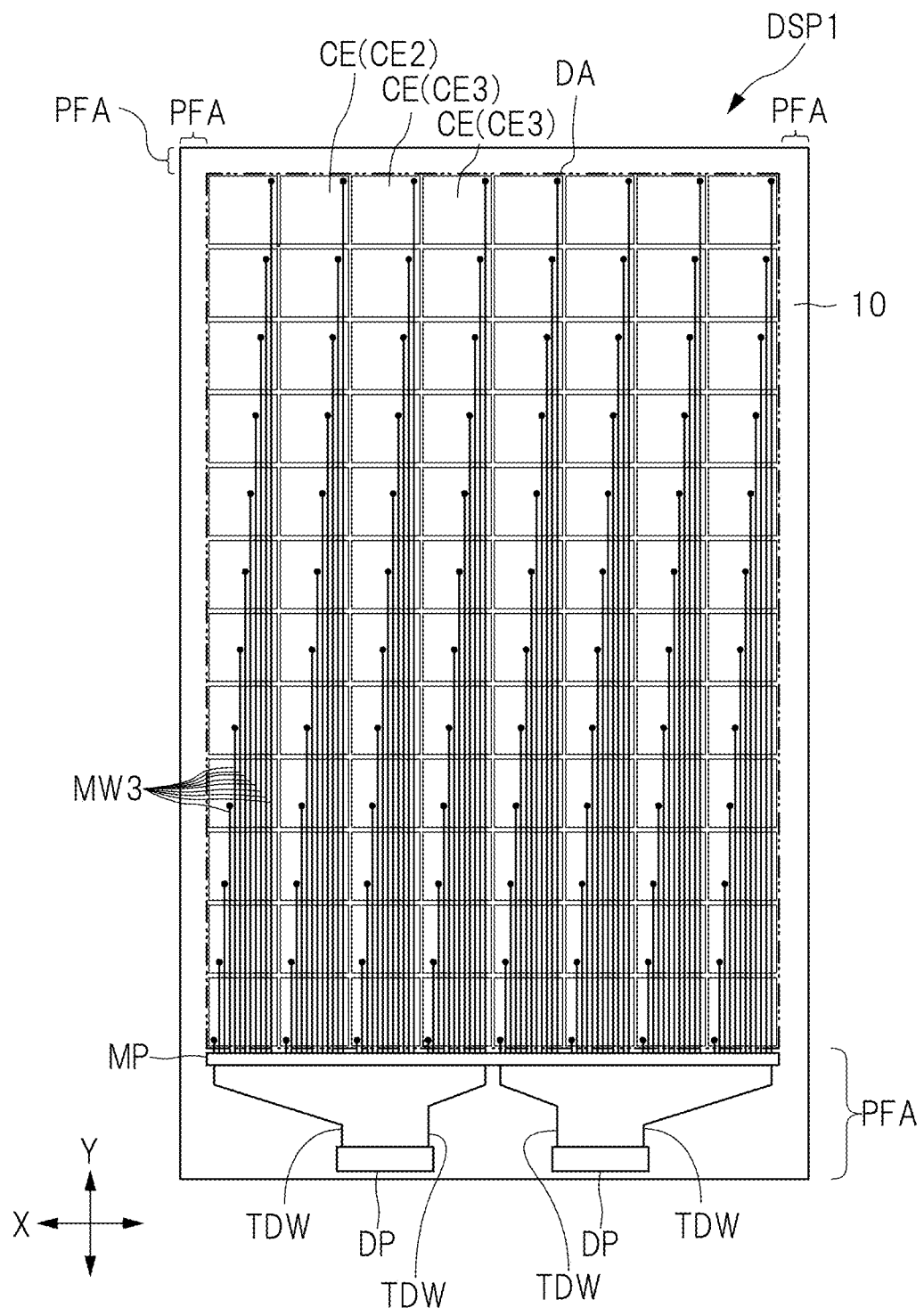
FIG. 5 is a plan view showing an example of a layout of common electrodes (touch detection electrodes) provided in the display device shown in FIG. 1.

Next, a touch panel function of the display device DSP1 according to the present embodiment will be described. FIG. 5 is a plan view showing an example of a layout of common electrodes (touch detection electrodes) provided in the display device shown in FIG. 1. In FIG. 5, among a large number of touch detection wirings TDW, four touch detection wirings TDW arranged at the ends of the touch detection wiring group are illustrated representatively.

The display device DSP1 is a sensor-equipped display device having a touch panel function that detects an input position by utilizing a change in electrostatic capacitance in a sensor region overlapping the display region DA. The display region DA shown in FIG. 1 includes a sensor region as a detection device having a touch panel function for detecting a change in electrostatic capacitance. As shown in FIG. 5, the display device DSP1 includes a plurality of electrodes CE separated from each other. The plurality of electrodes CE are arranged in a matrix in the X direction and the Y direction in the display region DA. Each electrode CE is schematically shown in a rectangular shape or a square shape in plan view. As described above, the electrodes CE are formed of the conductive layer CL4, and are made of, for example, a conductive material having visible light transmission properties such as ITO. As shown in FIG. 5, the plurality of electrodes CE are arranged in a matrix in the X direction and the Y direction in the display region DA. Each of the plurality of electrodes CE functions as a touch electrode to detect the contact or approach of a dielectric body such as a finger to a part of the display region DA. Namely, the display device DSP1 of the present embodiment has a plurality of electrodes (touch detection electrodes) CE arranged in the display region DA.

On the short side of the peripheral region PFA, a connection circuit MP is provided. Further, on the short side of the peripheral region PFA, a touch detection circuit (detection control circuit) DP for controlling the touch panel function is provided. For example, the touch detection circuit DP is formed in the semiconductor device SCP (see FIG. 2) mounted in the terminal region TMA shown in FIG. 1. The connection circuit MP and the detection circuit DP are electrically connected via the plurality of touch detection wirings TDW. The arrangement of the connection circuit MP and the detection circuit DP is not limited to the example shown in FIG. 5, and the connection circuit MP and the detection circuit DP may be provided on the substrate 10 of the display device DSP1. Also, the connection circuit MP may be a built-in circuit formed on the substrate 10, and it may be a circuit formed in the driver IC (for example, semiconductor device SCP shown in FIG. 2) mounted on the substrate 10. Alternatively, if the flexible wiring board (not shown) is connected to the terminal region TMA (see FIG. 1), the connection circuit MP and the detection circuit DP may be provided on the control board and the flexible wiring board outside the module.

The electrode CE is electrically connected to the detection circuit DP via the wiring MW3, the connection circuit MP, and the touch detection wiring TDW. The wiring MW3 and the touch detection wiring TDW supply a drive signal to the electrode CE, and send a signal corresponding to the change in electrostatic capacitance to the analog front end. For example, the drive circuit incorporated in the detection circuit DP is connected to each of the plurality of electrodes CE via the touch detection wiring TDW and the connection circuit MP arranged in the peripheral region PFA, and the wiring MW3. In the present embodiment, the plurality of wirings MW3 and the plurality of touch detection wirings TDW are distinguished as follows. That is, the plurality of wirings MW3 are wirings for touch detection formed in the display region DA. On the other hand, the plurality of touch detection wirings TDW are wirings for touch detection formed in the peripheral region PFA. The plurality of wirings MW3 and the plurality of touch detection wirings TDW are electrically connected via the connection circuit MP. Each of the plurality of wirings MW3 extends in the Y direction, and the plurality of wirings MW3 are arranged side by side in the X direction.

The detection circuit DP includes a circuit for supplying a drive signal for detecting a change in electrostatic capacitance and a circuit for receiving a detection signal output from the electrode CE during a detection period in which the touch panel function of the display device DSP1 operates. The connection circuit MP is provided between the electrode CE and the detection circuit DP. The connection circuit MP is a circuit for switching the connection and disconnection between the electrode CE to be the target of the detection drive and the detection circuit DP based on the control signal supplied from the detection circuit DP. The connection circuit MP has an analog front end.

In the insulating film 15 shown in FIG. 4, an opening (contact hole (not shown)) is formed at a position where the electrode CE and the wiring MW3 overlap, and the electrode CE and the wiring MW3 are electrically connected via the opening. In the example shown in FIG. 5, one wiring MW3 and one electrode CE are electrically connected. However, one electrode CE may be electrically connected to a plurality of wirings MW3. In this case, a bundle of the plurality of wirings MW3 connected to one electrode CE constitutes a transmission path of the drive signal and the detection signal for the touch detection.

In the case of the display device DSP1, the display period for displaying an image by driving the liquid crystal layer LQ (see FIG. 2) and the detection period for detecting the input position by driving the electrode CE are alternately repeated. In the display period, the electrode CE operates as a common electrode. Therefore, in the display period, a common potential for forming an electric field for driving the liquid crystal layer LQ is supplied to each of the plurality of electrodes CE arranged over the plurality of pixels. In other words, during the display period, a fixed potential (for example, first potential) is supplied to each of the plurality of touch detection wirings TDW, the plurality of wirings MW3, and the plurality of electrodes CE. Also, the electrode CE operates as a drive electrode for detecting the input position in the sensor region in the detection period. Therefore, in the detection period, a drive signal for detecting the input position is input from the detection circuit DP to the electrode CE. Also, in the detection period, the electrode CE operates as a detection electrode for detecting the input position in the sensor region. Therefore, in the detection period, the electrode CE outputs a detection signal corresponding to the input drive signal.

The detection signal from the electrode CE changes due to the influence of the electrostatic capacitance around the electrode CE. When an input device such as a finger is approaching the vicinity of one electrode CE among the plurality of electrodes CE, the electrostatic capacitance around the electrode CE changes due to the influence of the input device. In this case, the detection signal output from the electrode CE close to the input device has a waveform different from the detection signal output from the other electrodes CE. The detection circuit DP receives the detection signals supplied from the plurality of electrodes CE, and specifies the input position based on these detection signals.

The electrode CE of the present embodiment has both the function as a drive electrode to which the drive signal is supplied and the function as a detection electrode for outputting the detection signal. However, as a modification, the drive electrode and the detection electrode may be provided separately. For example, when the electrode CE is used as a drive electrode, a detection electrode may be provided separately from the electrode CE.

<Signal Selection Circuit>

Figure 6:
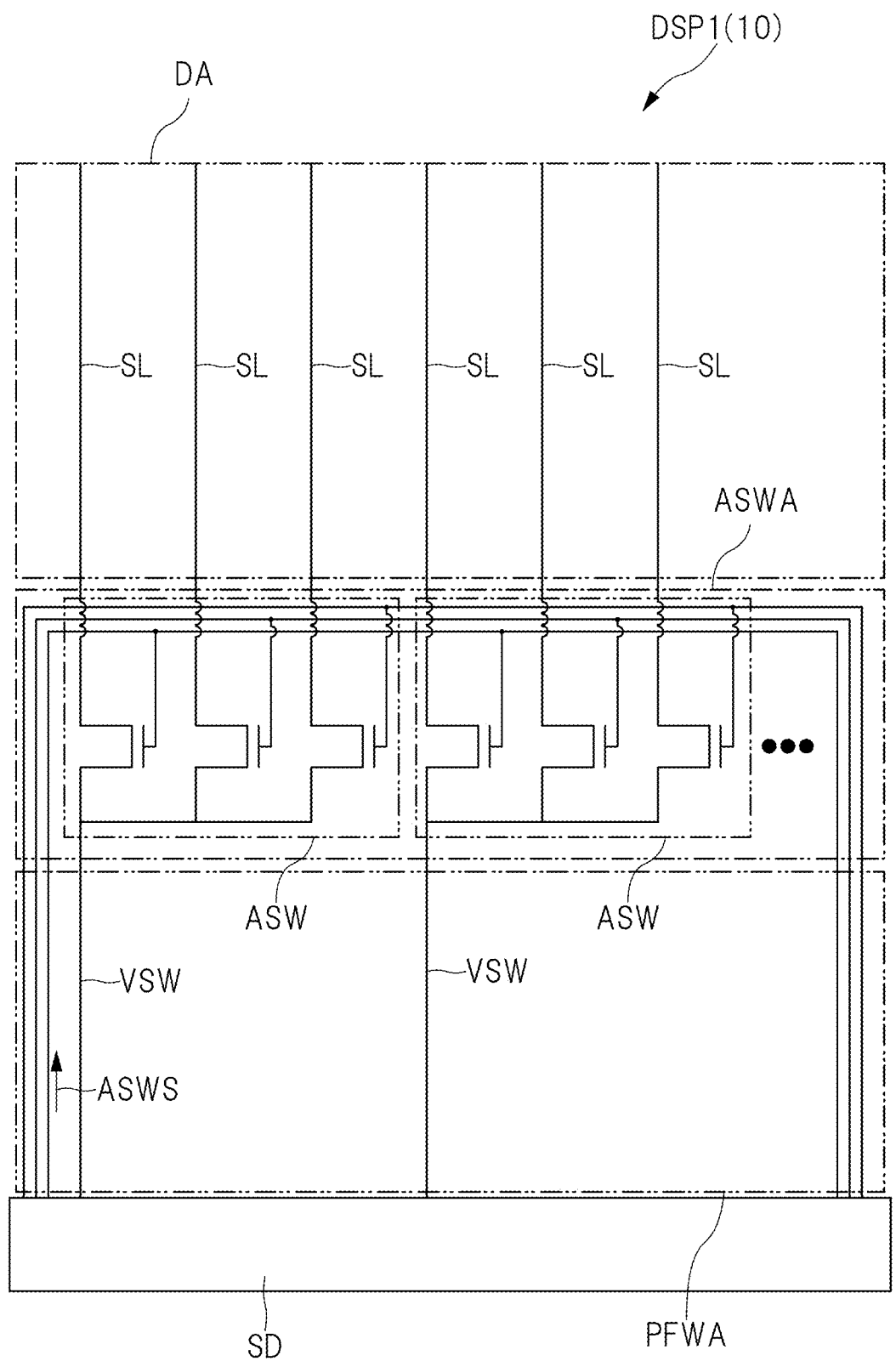
FIG. 6 is an explanatory diagram schematically showing an operation of a signal selection circuit arranged in the switch circuit region shown in FIG. 1.

Next, the signal selection circuit arranged in the switch circuit region ASWA shown in FIG. 1 will be described. FIG. 6 is an explanatory diagram schematically showing an operation of a signal selection circuit arranged in the switch circuit region shown in FIG. 1. In the present embodiment, a plurality of video signal lines SL and a plurality of video signal wirings VSW are distinguished as follows. That is, the plurality of video signal lines SL are wirings for transmitting the video signal formed in the display region DA. On the other hand, the plurality of video signal wirings VSW are wirings for transmitting the video signal formed in the peripheral region PFA. The plurality of video signal lines SL and the plurality of video signal wirings VSW are electrically connected via the signal selection circuit ASW shown in FIG. 6.

As shown in FIG. 6, a plurality of signal selection circuits ASW are arranged in the switch circuit region ASWA. The signal selection circuit ASW includes a plurality of (three in the example shown in FIG. 6) switching elements. Each of the plurality of switching elements provided in the signal selection circuit ASW is connected to the video signal line SL. In the example shown in FIG. 6, three video signal lines SL are connected to the signal selection circuit ASW composed of three sets of switching elements. On the other hand, one video signal wiring VSW is connected to one signal selection circuit ASW.

The signal selection circuit ASW selects each of the three switching elements and turns them on in order based on a signal selection signal ASWS input from the video signal drive circuit SD. When one of the three switching elements is in the on state, the other two switching elements are in the off state. The video signal VS (see FIG. 3) transmitted via the video signal wiring VSW is transmitted to one of the three video signal lines SL via the switching element in the on state. Since the three switching elements are turned on in order, the video signal VS is supplied to each of the three video signal lines SL in order.

As described above, by interposing the signal selection circuit ASW between the video signal line SL of the display region DA and the video signal wiring VSW of the peripheral wiring region PFWA, it is possible to reduce the video signal wiring VSW arranged in the peripheral wiring region PFWA. As shown in FIG. 6, the number of the plurality of video signal wirings VSW is less than the number of the plurality of video signal lines SL. In the example shown in FIG. 6, the number of the plurality of video signal wirings VSW is one-third of the number of the plurality of video signal lines SL. By reducing the number of wirings arranged in the peripheral wiring region PFWA, it is possible to reduce the area of the peripheral region PFA shown in FIG. 1.

<Measure Against Noise>

As described above, the signal selection circuit ASW has the advantage that it is possible to reduce the area of the peripheral region PFA, but it has been found that the electromagnetic waves generated with the switching operation of the signal selection circuit ASW cause the noise in some cases according to the studies by the inventors of this application. The display device DSP1 is applied as a portable terminal device having a wireless communication function with an external device in some cases. For example, in the example shown in FIG. 2, the display device includes a communication module TMM having a wireless communication function in addition to the display module DM including the substrate 10 and the substrate 20. When the electromagnetic waves generated with the switching operation of the signal selection circuit ASW interferes with the band of the wireless communication performed by the communication module TMM, they become the noise for wireless communication. Therefore, the inventors of this application studied the generation of electromagnetic waves with the switching operation of the signal selection circuit ASW or a technology for suppressing the diffusion of the generated electromagnetic waves.

The electromagnetic waves with the switching operation of the signal selection circuit ASW shown in FIG. 6 is particularly likely to be generated from the video signal wiring VSW arranged in the peripheral wiring region PFWA. Therefore, the inventors of this application studied the method of taking the measure against noise in the vicinity of the plurality of video signal wirings VSW. As a result of the study, it was found that the generation of electromagnetic waves with the switching operation of the signal selection circuit ASW or the diffusion of the generated electromagnetic waves could be suppressed by arranging a conductor pattern capacitively coupled to the plurality of video signal wirings VSW around the plurality of video signal wirings VSW. The concept of the measure against noise in the present embodiment will be described with reference to FIG. 7.

Figure 7:
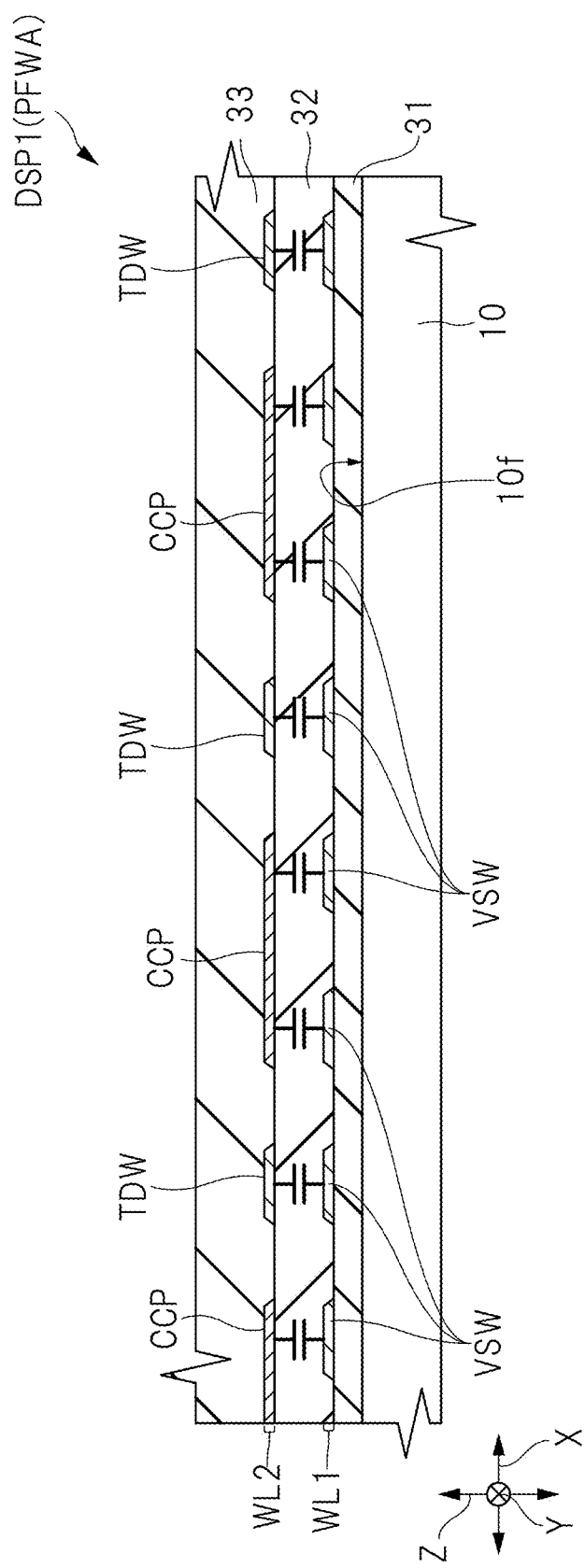
FIG. 7 is an enlarged cross-sectional view showing an example of a measure against noise in the peripheral wiring region shown in FIG. 1.

FIG. 7 is an enlarged cross-sectional view showing an example of a measure against noise in the peripheral wiring region shown in FIG. 1. In FIG. 7, the state in which the conductor pattern formed in a wiring layer WL1 and the conductor pattern formed in a wiring layer WL2 are capacitively coupled is schematically shown using the circuit symbol of the capacitor.

As shown in FIG. 7, the peripheral wiring region PFWA includes an insulating layer 31 on the substrate 10, the wiring layer WL1 on the insulating layer 31, the insulating layer 32 which is present on the insulating layer 31 and covers the wiring layer WL1, and the wiring layer WL2 on the insulating layer 32. The insulating layer 31 is, for example, an inorganic insulating film composed of a stacked film of the insulating film 11, the insulating film 12, and the insulating film 13 shown in FIG. 4. The insulating layer 32 is, for example, an organic insulating film (planarization film) corresponding to the insulating film 14 shown in FIG. 4. The insulating layer 33 is, for example, an organic insulating film corresponding to the insulating film 15 shown in FIG. 4. Also, the wiring layer WL1 corresponds to the conductive layer CL2 shown in FIG. 4, and the wiring layer WL2 corresponds to the conductive layer CL3 shown in FIG. 4.

As shown in FIG. 7, the plurality of video signal wirings VSW are arranged in the wiring layer WL1. The plurality of touch detection wirings TDW and conductor patterns CCP are formed in the wiring layer WL2. In the display period in which the signal selection circuit ASW shown in FIG. 6 operates, a fixed potential (for example, the same potential as the common potential supplied to the touch detection wiring TDW) is supplied to the conductor pattern CCP. Further, the conductor pattern CCP is arranged at the position overlapping a part of the plurality of video signal wirings VSW and is capacitively coupled to apart of the plurality of video signal wirings VSW.

As shown in FIG. 7, the other part of the plurality of video signal wirings VSW (hereinafter, referred to as the other part) overlaps the touch detection wiring TDW. As described above, the touch detection wiring TDW is utilized as a transmission path for supplying a common potential to each of the plurality of electrodes CE shown in FIG. 5 in the display period. Therefore, in the display period in which the signal selection circuit ASW shown in FIG. 6 operates, the common potential is supplied to the touch detection wiring TDW. Therefore, when the noise current flows through the video signal wiring VSW capacitively coupled to the touch detection wiring TDW among the plurality of video signal wirings VSW, the noise component can be reduced by the decoupling function of the capacitor to be coupled to the video signal wiring VSW through which the noise current flows.

However, the number of touch detection wirings TDW is less than the number of video signal wirings VSW. In other words, the number of video signal wirings VSW is greater than the number of touch detection wirings TDW. Therefore, not all the video signal wirings VSW overlap the touch detection wirings TDW. Accordingly, in the present embodiment, the conductor pattern CCP is arranged at a position overlapping the video signal wiring VSW, which is arranged at a position that does not overlap the touch detection wiring TDW, among the plurality of video signal wirings VSW, whereby the noise component flowing through each of the plurality of video signal wirings VSW can be reduced. The conductor pattern CCP shown in FIG. 7 is capacitively coupled to a part of the plurality of video signal wirings VSW, and the fixed potential is supplied to the conductor pattern CCP in the display period in which the signal selection circuit ASW shown in FIG. 6 operates. Thus, when the noise current flows through the video signal wiring VSW capacitively coupled to the conductor pattern CCP, the noise component can be reduced by the decoupling function of the capacitor to be coupled to the video signal wiring VSW through which the noise current flows.

Figure 8:
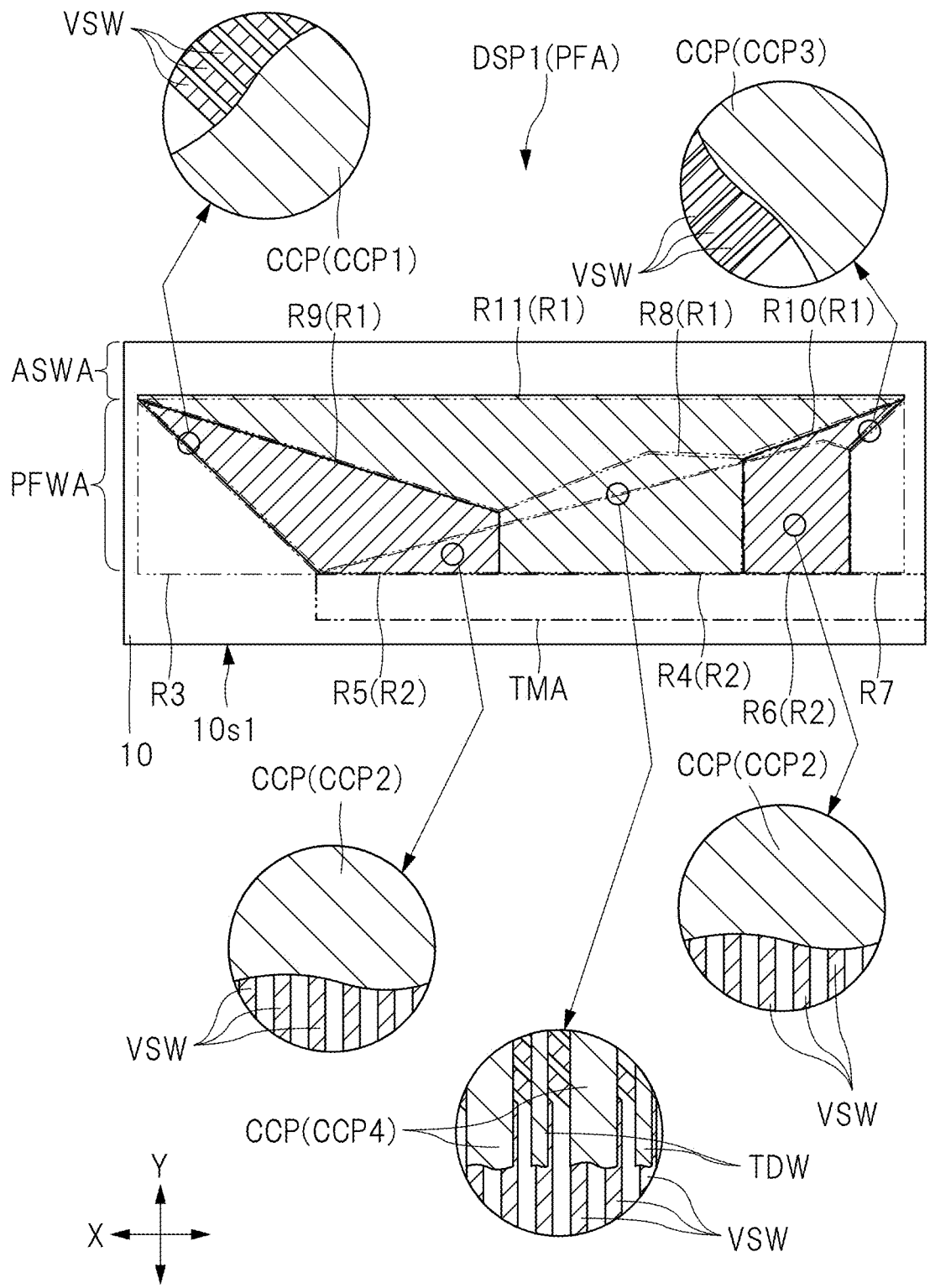
FIG. 8 is an enlarged plan view of the section B shown in FIG. 1.

There are various modes in the shape and the like of the conductor pattern CCP as the measure against noise. Hereinafter, a preferable mode of the conductor pattern CCP in each region will be described by illustrating several examples of the region where the conductor pattern CCP should be arranged. FIG. 8 is an enlarged plan view of the section B shown in FIG. 1. Although FIG. 8 is a plan view, the hatching is applied to each of the touch detection wiring TDW, the video signal wiring VSW, and the conductor pattern CCP in order to make the range where the touch detection wiring TDW and the video signal wiring VSW are arranged and the extending direction of the touch detection wiring TDW and the video signal wiring VSW easy to see.

As shown in FIG. 8, the peripheral wiring region PFWA can be classified into a plurality of regions depending on the presence or absence of the touch detection wiring TDW and the video signal wiring VSW and the extending direction thereof. The peripheral wiring region PFWA includes a wiring region R1 in which the plurality of video signal wirings VSW extend in a direction inclined with respect to each of the X direction and the Y direction. The peripheral wiring region PFWA includes a wiring region R2 which is present between the terminal region TMA and the wiring region R1 in the Y direction and in which the plurality of video signal wirings VSW extend in the Y direction. The peripheral wiring region PFWA includes a wiring region R3 which is present between the side 10$s$1 and the wiring region R1 in the Y direction and in which the video signal wiring VSW is not arranged. Note that a wiring region R7 described later is also a region which is present between the side 10$s$1 and the wiring region R1 in the Y direction and in which the video signal wiring VSW is not arranged similarly to the wiring region R3. However, in the present embodiment, the wiring region R3 and the wiring region R7 will be described separately. Further, the peripheral wiring region PFWA includes a wiring region R9, in which the touch detection wiring TDW is not arranged, in the wiring region R1. In the wiring region R9, the noise is likely to be diffused from the plurality of video signal wirings VSW. Therefore, it is preferable that the conductor pattern CCP as a measure against noise generated from the video signal wiring VSW is arranged at the position overlapping the plurality of video signal wirings VSW in the wiring region R9. The wiring region R3 in which the video signal wiring VSW and the touch detection wiring TDW are not arranged is present next to the wiring region R9. A conductor pattern CCP1 is arranged so as to straddle the boundary between the wiring region R3 and the wiring region R1 (specifically wiring region R9). In other words, the conductor pattern CCP includes the conductor pattern CCP1 arranged so as to straddle the boundary between the wiring region R3 and the wiring region R1. Thus, it is possible to reduce the generation of noise from the plurality of video signal wirings VSW arranged in the wiring region R9.

The structure described above can also be expressed as follows. That is, the peripheral wiring region PFWA includes the wiring region R9, in which the touch detection wiring TDW is not arranged, in the wiring region R1. The plurality of conductor patterns CCP include the conductor pattern CCP1 arranged in the wiring region R9. In the case of this expression, the case where the conductor pattern CCP1 is arranged in the wiring region R9 and is not arranged in the wiring region R3 is also included in addition to the case where the conductor pattern CCP1 is arranged so as to straddle the wiring region R3 and the wiring region R9.

Also, the peripheral wiring region PFWA includes a wiring region R4, in which the plurality of touch detection wirings TDW are arranged adjacent to each other in the wiring layer WL2, in the wiring region R2. The peripheral wiring region PFWA includes a wiring region R5 and a wiring region R6, in which the touch detection wiring TDW is not arranged and which are present between the wiring region R1 and the terminal region TMA in the Y direction, in the wiring region R2. In the X direction, the wiring region R4 is present between the wiring region R5 and the wiring region R6. In other words, the wiring region R5 and the wiring region R6 are present on the sides opposite to each other in the X direction, with interposing the wiring region R4 therebetween. Each of the wiring region R5 and the wiring region R6, the plurality of video signal wirings VSW are arranged, and the touch detection wiring TDW is not arranged. Therefore, it is preferable that a conductor pattern CCP as a measure against noise generated from the video signal wiring VSW is arranged at the position overlapping the plurality of video signal wirings VSW in each of the wiring region R5 and the wiring region R6. In the example shown in FIG. 8, the conductor pattern CCP includes a conductor pattern CCP2 arranged in each of the wiring region R5 and the wiring region R6.

Further, the peripheral wiring region PFWA includes a wiring region R7, which is present next to the wiring region R6 in the X direction and is present between the side 10$s$1 and the wiring region R1 in the Y direction and in which the video signal wiring VSW is not arranged. The video signal wiring VSW and the touch detection wiring TDW are not arranged in the wiring region R7. Further, the peripheral wiring region PFWA includes a wiring region R10, in which the touch detection wiring TDW is not arranged, in the wiring region R1. In the wiring region R10, the noise is likely to be diffused from the plurality of video signal wirings VSW similarly to the wiring region R9. Therefore, it is preferable that the conductor pattern CCP as a measure against noise generated from the video signal wiring VSW is arranged at the position overlapping the plurality of video signal wirings VSW in the wiring region R10. The wiring region R7 in which the video signal wiring VSW and the touch detection wiring TDW are not arranged is present next to the wiring region R10. A conductor pattern CCP3 is arranged so as to straddle the boundary between the wiring region R7 and the wiring region R1 (specifically wiring region R10). In other words, the conductor pattern CCP includes the conductor pattern CCP3 arranged so as to straddle the boundary between the wiring region R7 and the wiring region R1. Thus, it is possible to reduce the generation of noise from the plurality of video signal wirings VSW arranged in the wiring region R10.

The structure related to the region R10 described above can also be expressed as follows. That is, the peripheral wiring region PFWA includes a wiring region R8, in which the plurality of touch detection wirings TDW extend in the Y direction, in the wiring region R1. The peripheral wiring region PFWA includes the wiring region R9 and the wiring region R10, in which the touch detection wiring TDW is not arranged, in the wiring region R1. The wiring region R8 is arranged between the wiring region R9 and the wiring region R10 in plan view. The plurality of conductor patterns CCP include the conductor pattern CCP3 arranged in the wiring region R10. In the case of this expression, the case where the conductor pattern CCP3 is arranged in the wiring region R10 and is not arranged in the wiring region R7 is also included in addition to the case where the conductor pattern CCP3 is arranged so as to straddle the wiring region R7 and the wiring region R10.

Further, the peripheral wiring region PFWA includes the wiring region R4, in which the plurality of touch detection wirings TDW are arranged adjacent to each other in the wiring layer WL2, in the wiring region R2. The peripheral wiring region PFWA includes the wiring region R8, in which the plurality of touch detection wirings TDW extend in the Y direction, in the wiring region R1. In the wiring region R4 and the wiring region R8, since each of the plurality of touch detection wirings TDW extends in the Y direction, the separation distance between the adjacent touch detection wirings TDW is large. Therefore, from the viewpoint of suppressing the generation of noise from the part of the plurality of video signal wirings VSW arranged in the gap between the adjacent touch detection wirings TDW, the conductor pattern CCP is preferably arranged in this part. In the example shown in FIG. 8, a conductor pattern CCP4 is arranged so as to straddle the boundary between the wiring region R4 and the wiring region R8. In other words, the conductor pattern CCP includes a plurality of conductor patterns CCP4 arranged so as to straddle the boundary between the wiring region R4 and the wiring region R8. Thus, it is possible to reduce the generation of noise from the plurality of video signal wirings VSW arranged in the wiring region R4 and the wiring region R8.

Further, the peripheral wiring region PFWA includes a wiring region R11, in which the plurality of touch detection wirings TDW extend in a direction inclined with respect to each of the X direction and the Y direction, in the wiring region R1. In the region where the extending direction of the touch detection wiring TDW is inclined with respect to each of the X direction and the Y direction, the separation distance of the adjacent touch detection wirings TDW is small as compared with the region where each of the plurality of touch detection wirings TDW extends in the Y direction (for example, the wiring region R4 and the wiring region R8). Therefore, the conductor pattern CCP is not arranged between the adjacent touch detection wirings TDW. In the wiring region R10, even if the conductor pattern CCP is not arranged, since most of the plurality of video signal wirings VSW overlap the touch detection wiring TDW, the risk of noise generation is relatively low.

In the example shown in FIG. 8, the mode in which the conductor pattern CCP is arranged in each of the wiring region R4, the wiring region R5, the wiring region R6, the wiring region R8, the wiring region R9, and the wiring region R10 has been illustrated. However, as a modification, the conductor pattern CCP may be arranged in one or some of the wiring region R4, the wiring region R5, the wiring region R6, the wiring region R8, the wiring region R9, and the wiring region R10 shown in FIG. 8. In this case, the generation of noise from the plurality of video signal wirings VSW can be reduced in the wiring region in which the conductor pattern CCP is arranged.

<Wiring Regions R9 and R10>

Figure 9:
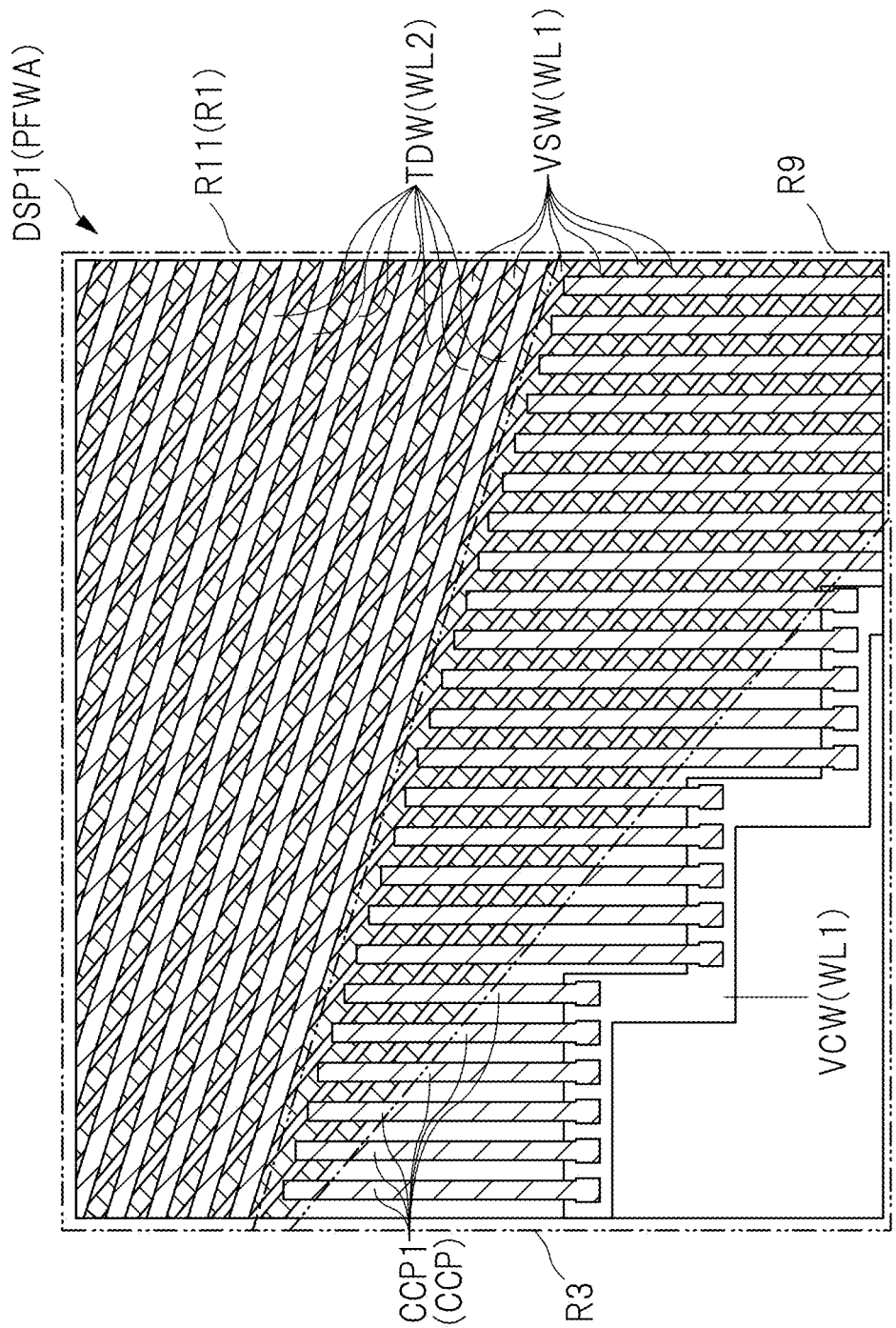
FIG. 9 is an enlarged plan view showing a modification in a part of the wiring region shown in FIG. 8.

Next, details of each wiring region described with reference to FIG. 8 will be described together with modifications. FIG. 9 is an enlarged plan view showing a modification in a part (around the boundary between the wiring region R9 and the wiring region R3) of the wiring region shown in FIG. 8. Although FIG. 9 is a plan view, the hatching is applied to each of the touch detection wiring TDW, the video signal wiring VSW, and the conductor pattern CCP in order to easily distinguish the touch detection wiring TDW and the video signal wiring VSW.

In the example shown in FIG. 9, the conductor pattern CCP1 in FIG. 9 is different from the conductor pattern CCP1 shown in FIG. 8 in that it is formed as a plurality of elongated wiring patterns. The conductor pattern CCP includes the plurality of conductor patterns CCP1 extending in the Y direction so as to straddle the boundary between the wiring region R3 and the wiring region R1. However, the conductor pattern CCP1 may be the conductor pattern CCP having a large area uniformly spreading to the wiring region R3 and the wiring region R9 as shown in FIG. 8. Alternatively, although not shown, the case where the mesh-shaped conductor pattern CCP is used as the conductor pattern CCP1 is also possible.

Each of the plurality of conductor patterns CCP1 extends from the wiring region R3 in the Y direction. Further, each of the plurality of conductor patterns CCP1 extends to the vicinity of the boundary between the wiring region R9 and the wiring region R11, but is not formed in the wiring region R11. In the wiring region R11, the plurality of touch detection wirings TDW are arranged. In other words, each of the plurality of conductor patterns CCP1 extends to the vicinity of the touch detection wiring TDW.

Further, as shown in FIG. 9, in the wiring region R3, a wiring VCW arranged along the boundary between the wiring region R3 and the wiring region R1 is arranged in the wiring layer WL1. The wiring (first potential wiring) VCW is a wiring for electromagnetically shielding the peripheral region PFA around the display region DA shown in FIG. 1. The wiring VCW is arranged in the peripheral region PFA so as to surround the periphery of the display region DA. Also, a fixed potential is supplied to the wiring VCW in any of the display period and the touch detection period described above. Each of the plurality of conductor patterns CCP1 is electrically connected to each other via the wiring VCW. In this case, a fixed potential is supplied to each of the plurality of conductor patterns CCP1 via the wiring VCW. Therefore, by capacitively coupling each of the plurality of conductor patterns CCP1 to the plurality of video signal wirings VSW in the wiring region R9, the generation of noise from the plurality of video signal wirings VSW can be suppressed.

Note that there are various modifications of the method of supplying a fixed potential to the conductor pattern CCP1 shown in FIG. 8 and FIG. 9. However, by utilizing the wiring which is arranged for another purpose and to which a fixed potential is supplied like the wiring VCW shown in FIG. 9, it is possible to easily supply a fixed potential to the conductor pattern CCP1.

Further, although FIG. 9 is an enlarged plan view of the periphery of the boundary between the wiring region R9 and the wiring region R3 shown in FIG. 8, it is also possible to apply to the periphery of the boundary between the wiring region R10 and the wiring region R7 shown in FIG. 8. In this case, it is possible to apply by reading the wiring region R9 as the wiring region R10, reading the wiring region R3 as the wiring region R7, and reading the conductor pattern CCP1 as the conductor pattern CCP3 in the description of this section. Note that, when the wiring VCW is arranged in the wiring region R7, it is possible to easily electrically connect the conductor pattern CCP3 and the wiring VCW. Further, when the wiring VCW is not arranged in the wiring region R7, it is preferable that a conductor pattern such as a wiring or an electrode to which a certain fixed potential is supplied in at least the display period is formed in the wiring region R7, and the conductor pattern CCP3 is connected to this conductor pattern.

<Wiring Regions R4 and R8>

Figure 10:
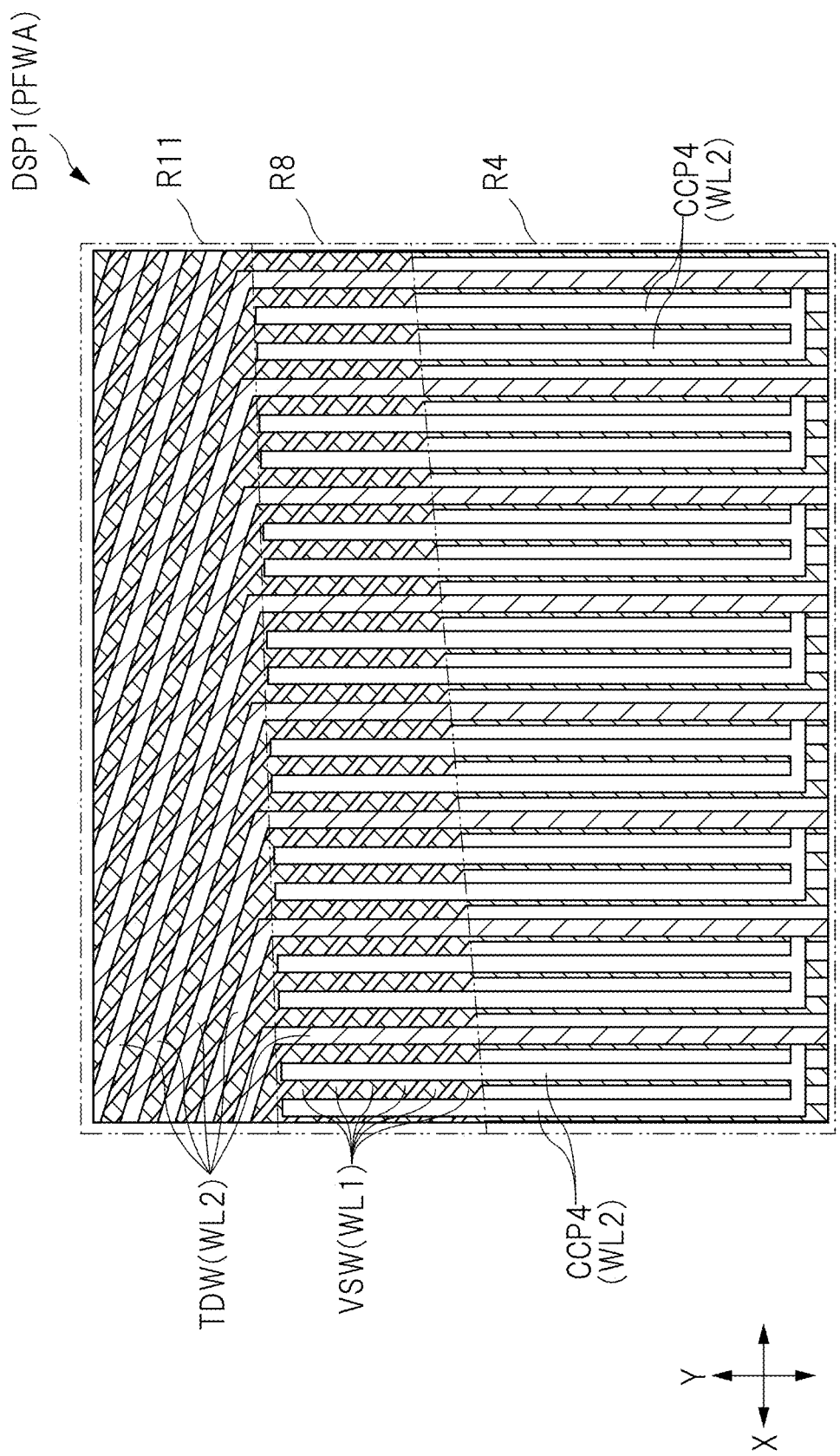
FIG. 10 is an enlarged plan view showing a modification in another part of the wiring region shown in FIG. 8.
Figure 11:
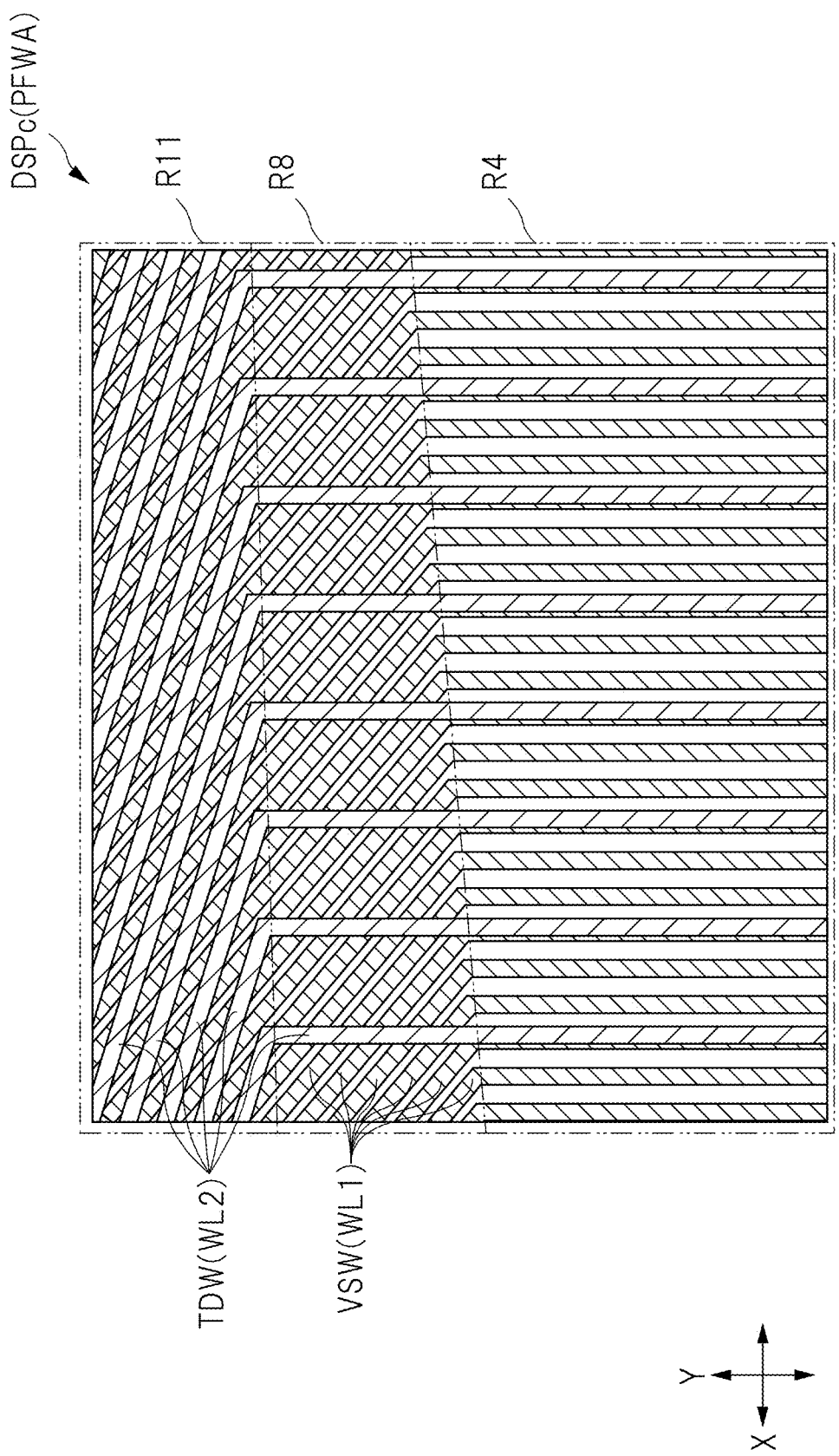
FIG. 11 is an enlarged plan view showing a studied example for FIG. 10.

Next, details of the structure around the wiring region R4 and the wiring region R8 shown in FIG. 8 will be described. FIG. 10 is an enlarged plan view showing a modification in another part (around the boundary between the wiring region R4 and the wiring region R8) of the wiring region shown in FIG. 8. FIG. 11 is an enlarged plan view showing a studied example for FIG. 10. Although FIG. 10 and FIG. 11 are plan views, the hatching is applied to each of the touch detection wiring TDW and the video signal wiring VSW in order to easily distinguish the touch detection wiring TDW and the video signal wiring VSW.

As shown in a display device DSPc illustrated as a studied example in FIG. 11, when no measure against noise is taken for the wiring region R4 and the wiring region R8, the area of the part of the plurality of video signal wirings VSW that does not overlap the touch detection wiring TDW is large. Therefore, from the viewpoint of suppressing the generation of noise from the part of the plurality of video signal wirings VSW that is arranged in the gap between the adjacent touch detection wirings TDW, it is preferable that the conductor pattern CCP (see FIG. 8 or FIG. 10) is arranged in this part. In the case of the display device DSP1 shown in FIG. 10, the conductor pattern CCP4 is arranged between the adjacent touch detection wirings TDW. The conductor pattern CCP4 is arranged so as to straddle the boundary between the wiring region R4 and the wiring region R8. Thus, it is possible to reduce the generation of noise from the plurality of video signal wirings VSW arranged in the wiring region R4 and the wiring region R8.

Further, in the case of the example shown in FIG. 10, each of the plurality of conductor patterns CCP4 is formed in the wiring layer WL2. Further, each of the plurality of conductor patterns CCP4 is connected to any one of the plurality of touch detection wirings TDW in the wiring layer WL2. In other words, one touch detection wiring TDW is branched as the plurality of conductor patterns CCP4. As described above, a fixed potential (for example, first potential) is supplied to each of the plurality of touch detection wirings TDW during the display period. When the conductor pattern CCP4 and the touch detection wiring TDW are electrically connected, the fixed potential is supplied also to the conductor pattern CCP4 during the display period. Therefore, it can be utilized as a pattern for the measure against noise even without connecting the conductor pattern CCP4 to another supply source of a fixed potential.

The location where the conductor pattern CCP4 is connected to the touch detection wiring TDW is not particularly limited. However, from the viewpoint of obtaining the noise suppression effect by the conductor pattern CCP4, the conductor pattern CCP4 preferably extends to the vicinity of the terminal region TMA shown in FIG. 8.

Further, in the case of the example shown in FIG. 10, in the wiring region R8, one or more conductor patterns CCP4 (two conductor patterns CCP4 in FIG. 10) among the plurality of conductor patterns CCP4 are arranged between the two adjacent touch detection wirings TDW among the plurality of touch detection wirings TDW. However, the number of the conductor patterns CCP4 and the thickness of the line thereof can be appropriately changed. For example, a thick one conductor pattern CCP4 or two or more thin conductor patterns CCP4 can also be applied. In this case, the following effects can be obtained. When the conductor pattern CCP4 and the touch detection wiring TDW are electrically connected as shown in the example of FIG. 10, it is necessary to consider the influence of the conductor pattern CCP4 on false detection in the touch detection period. When the area of the touch detection wiring TDW in the peripheral wiring region PFWA becomes large with respect to the area of the electrode CE as the touch detection electrode described with reference to FIG. 5, the false detection is likely to occur. Therefore, from the viewpoint of reducing the false detection, it is preferable to reduce the area of the touch detection wiring TDW in the peripheral wiring region PFWA.

As shown in FIG. 10, when the conductor pattern CCP4 is connected to the touch detection wiring TDW, the conductor pattern CCP4 can be regarded as a part of the touch detection wiring TDW on the circuit. Therefore, from the viewpoint of reducing the area of the conductor pattern CCP4 and overlapping the plurality of video signal wirings VSW in a wide range, it is preferable that the conductor pattern CCP4 arranged between the adjacent touch detection wirings TDW is divided into a plurality of portions.

Of course, as a modification of the example shown in FIG. 10, a method of supplying a fixed potential to the conductor pattern CCP4 from a path different from the touch detection wiring TDW without connecting the conductor pattern CCP4 to the touch detection wiring TDW is also possible. In this case, as shown in FIG. 8, even in the configuration in which one conductor pattern CCP4 having a width greater than the wiring width of the touch detection wiring TDW is arranged between the adjacent touch detection wirings TDW, the occurrence of false detection can be suppressed. Further, it is true that it is preferable to reduce the area of the touch detection wiring TDW in the peripheral wiring region PFWA in order to suppress the occurrence of false detection, but the false detection may not occur depending on the setting conditions of the touch detection circuit, even when the conductor pattern CCP4 shown in FIG. 8 is connected to the touch detection wiring TDW. In this case, the conductor pattern CCP4 shown in FIG. 8 may be connected to the touch detection wiring TDW.

<Capacitance Adding Method in Layer Other than Wiring Layer WL2>

Figure 12:
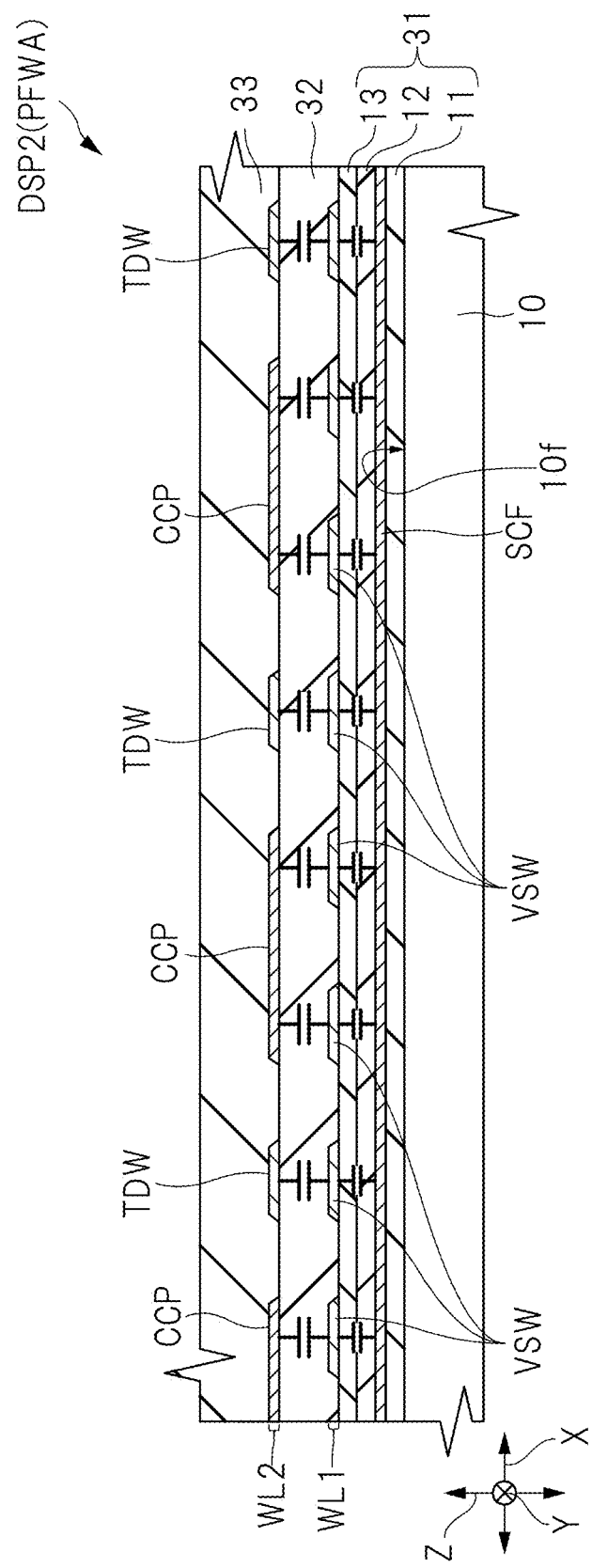
FIG. 12 is an enlarged cross-sectional view showing a modification for FIG. 7.
Figure 13:
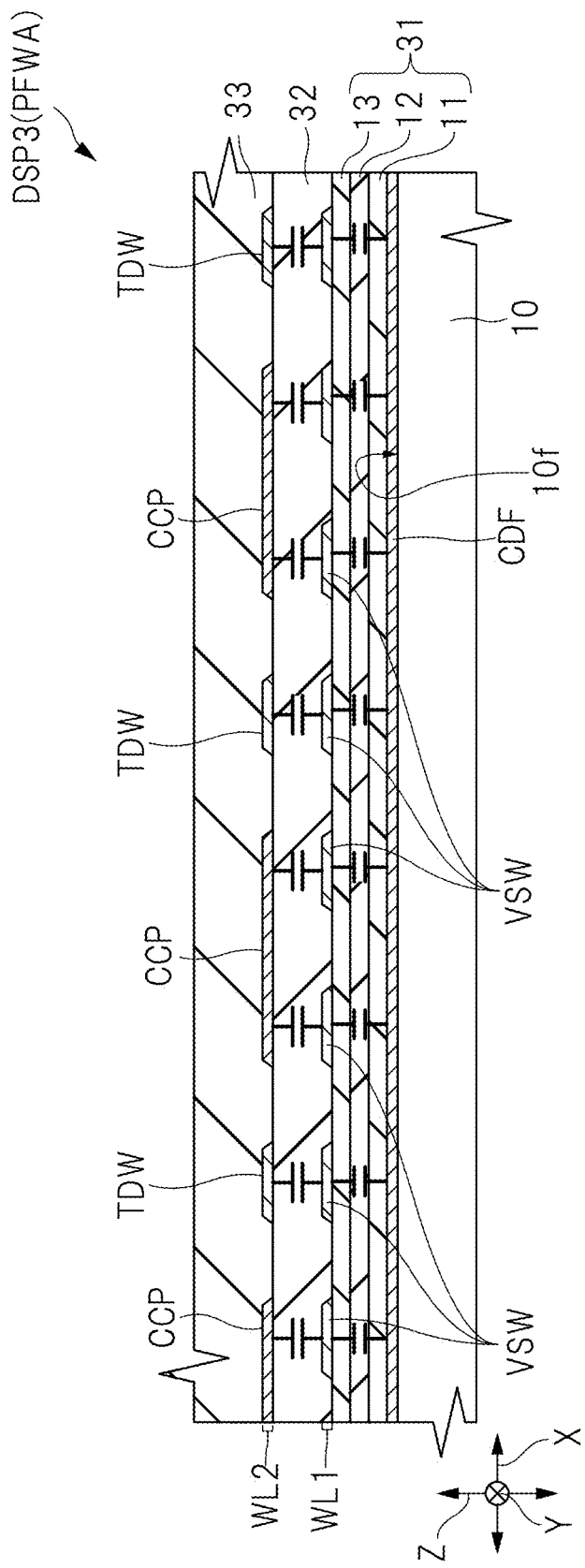
FIG. 13 is an enlarged cross-sectional view showing another modification for FIG. 7.
Figure 14:
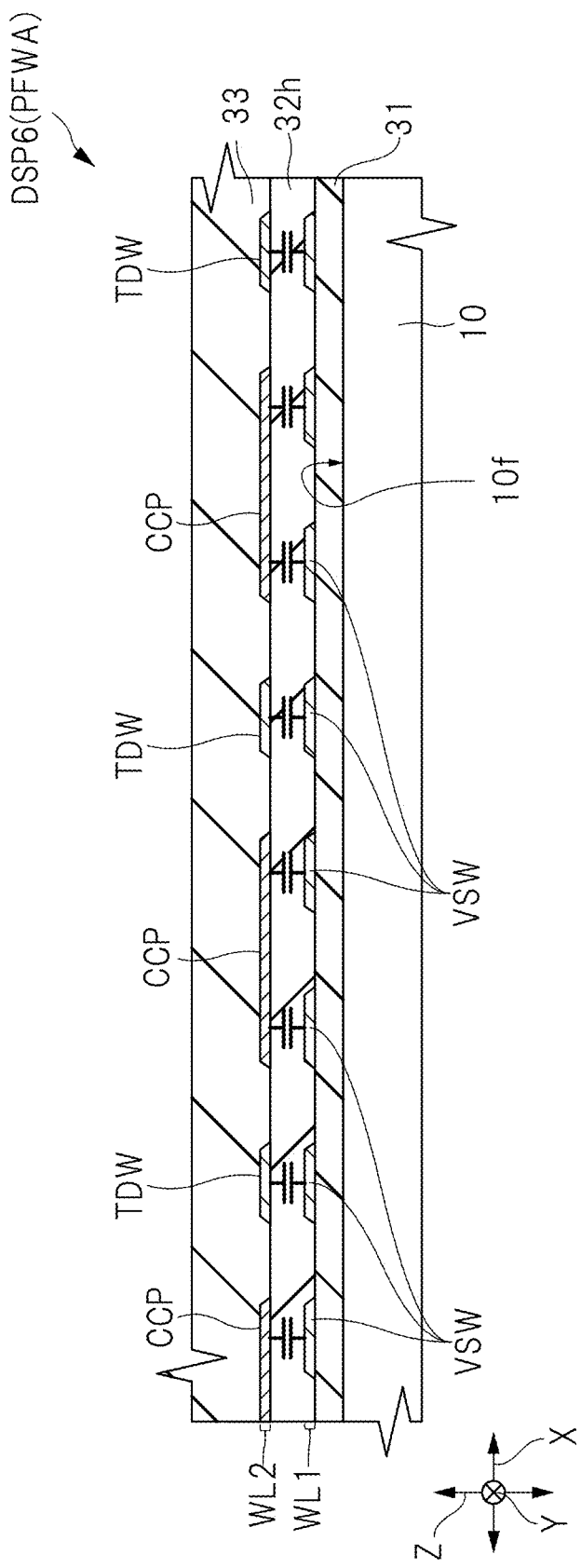
FIG. 14 is an enlarged cross-sectional view showing another modification for FIG. 7.

Next, in addition to the measure against noise by the conductor pattern CCP described with reference to FIG. 7 to FIG. 10, the method in which a conductor pattern is arranged in a layer other than the wiring layer WL2 shown in FIG. 7 and is capacitively coupled to the plurality of video signal wirings VSW will be described. FIG. 12 is an enlarged cross-sectional view showing a modification in FIG. 7. FIG. 13 is an enlarged cross-sectional view showing another modification for FIG. 7. FIG. 14 is an enlarged cross-sectional view showing another modification for FIG. 7.

The display device DSP2 shown in FIG. 12 is different from the display device DSP1 shown in FIG. 7 in the following points. That is, the peripheral wiring region PFWA of the display device DSP2 further includes a semiconductor film SCF formed between the substrate 10 and the wiring layer WL1. The semiconductor film SCF is arranged at a position overlapping a part of the plurality of video signal wirings VSW and is capacitively coupled to a part of the plurality of video signal wirings VSW. The semiconductor film SCF is made of the same material as the semiconductor layer (not shown) used as the channel layer of the transistor Tr1 shown in FIG. 3. The semiconductor film SCF is a film made of, for example, polysilicon, and is arranged at a corresponding portion between the insulating film 11 and the insulating film 12. Also, a fixed potential is supplied to the semiconductor film SCF. Although the type of potential supplied to the semiconductor film SCF is not limited, for example, the semiconductor film SCF is electrically connected to the wiring VCW shown in FIG. 9. In the peripheral wiring region PFWA shown in FIG. 9, the semiconductor film SCF to which a fixed potential is supplied is arranged at a position overlapping the plurality of video signal wirings VSW, so that each of the plurality of video signal wirings VSW is capacitively coupled to the semiconductor film SCF as schematically shown using the circuit symbol of the capacitor in FIG. 12. Thus, in the peripheral wiring region PFWA, the noise generated from the plurality of video signal wirings VSW can be reduced. Although FIG. 12 shows an example in which the semiconductor film SCF is formed in the entire peripheral wiring region PFWA, there are various modifications of the shape of the semiconductor film SCF. For example, the semiconductor film SCF may be divided into a plurality of portions in the peripheral wiring region PFWA. Further, the semiconductor film SCF is electrically separated from the semiconductor layer in the display region DA (see FIG. 1). For example, the semiconductor film SCF is formed only in the peripheral region PFA shown in FIG. 1, but is not formed in the display region DA.

Further, the display device DSP3 shown in FIG. 13 is different from the display device DSP1 shown in FIG. 7 in the following points. That is, the peripheral wiring region PFWA of the display device DSP3 further includes a conductor film CDF formed between the substrate 10 and the wiring layer WL1. The conductor film CDF is arranged at a position overlapping a part of the plurality of video signal wirings VSW, and is capacitively coupled to a part of the plurality of video signal wirings VSW. The conductor film CDF is, for example, a metal film used as a light shielding film for shielding the peripheral region PFA (see FIG. 1) from light. Also, a fixed potential is supplied to the conductor film CDF. Although the type of potential supplied to the conductor film CDF is not limited, for example, the conductor film CDF is electrically connected to the wiring VCW shown in FIG. 9. In the peripheral wiring region PFWA shown in FIG. 9, the conductor film CDF to which a fixed potential is supplied is arranged at a position overlapping the plurality of video signal wirings VSW, so that each of the plurality of video signal wirings VSW is capacitively coupled to the conductor film CDF as schematically shown using the circuit symbol of the capacitor in FIG. 13. Thus, in the peripheral wiring region PFWA, the noise generated from the plurality of video signal wirings VSW can be reduced. Although FIG. 13 shows an example in which the conductor film CDF is formed in the entire peripheral wiring region PFWA, there are various modifications of the shape of the conductor film CDF. For example, the conductor film CDF may be divided into a plurality of portions in the peripheral wiring region PFWA. Further, for example, the conductor film CDF may be formed only in the peripheral region PFA shown in FIG. 1 and may not be formed in the display region DA.

Further, the display device DSP6 shown in FIG. 14 is different from the display device DSP1 shown in FIG. 7 in the following points. That is, an insulating layer 32h shown in FIG. 14 has a thickness different from that of the insulating layer 32 shown in FIG. 7. The insulating layer 32h is formed so as to have a thickness smaller than that of the insulating layer 32. The insulating layer 32h is an insulating film made of an organic resin corresponding to the insulating film 14 shown in FIG. 4, but it is formed so as to be thinner than the insulating film 14 in the display region DA and the insulating layer 32 in the peripheral region PFWA. Since the insulating layer 32h is formed thinly, when the noise current flows through the video signal wiring VSW capacitively coupled to the touch detection wiring TDW among the plurality of video signal wirings VSW, the decoupling function of the capacitor to be coupled to the video signal wiring VSW through which the noise current flows can be increased as compared with FIG. 7, and the noise component can be reduced. How much the insulating layer 32h is made thin as compared with the insulating film 14 shown in FIG. 4 can be changed as appropriate. However, in order to maintain the flatness of the peripheral region PFWA, the thickness of the insulating layer 32h is preferably about half of the thickness of the insulating film 14 shown in FIG. 4.

As in the display device DSP2 shown in FIG. 12, the display device DSP3 shown in FIG. 13, and the display device DSP6 shown in FIG. 14, by making the capacitive coupling to the plurality of video signal wirings VSW by utilizing the conductor pattern formed in another layer in addition to the conductor pattern CCP formed in the wiring layer WL2, it is possible to increase the value of the capacitance coupled to the video signal wiring VSW. As a result, the noise suppression effect can be improved. In the examples shown in FIG. 12 and FIG. 13, the mode in the region corresponding to the wiring region R4 and the wiring region R8 shown in FIG. 8 is illustrated representatively. However, the modifications shown in FIG. 12 and FIG. 13 can be applied also to the wiring region R9, the wiring region R10, and the wiring region R11 shown in FIG. 8.

Each of the display device DSP2 shown in FIG. 12 and the display device DSP3 shown in FIG. 13 is the same as the display device DSP1 described with reference to FIG. 1 to FIG. 10 except for the differences described above. Therefore, a duplicate description will be omitted.

Figure 15:
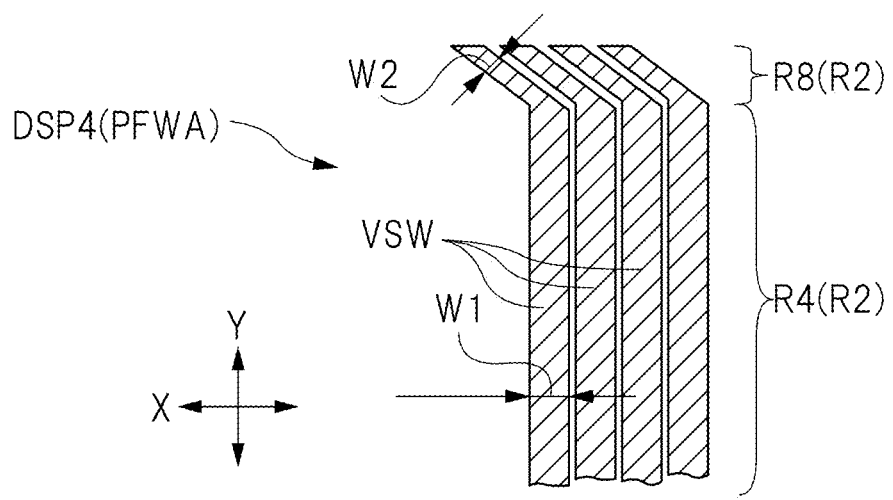
FIG. 15 is an enlarged plan view showing a modification of the plurality of video signal wirings shown in FIG. 10.
Figure 16:
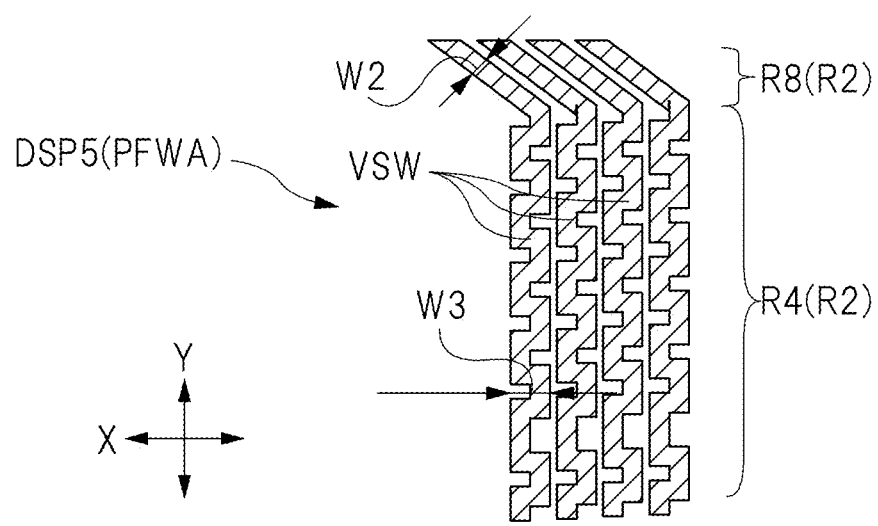
FIG. 16 is an enlarged plan view showing another modification of the plurality of video signal wirings shown in FIG. 10.

Next, another method of increasing the value of the capacitance schematically shown using the circuit symbol of the capacitor in FIG. 7 will be described. FIG. 15 is an enlarged plan view showing a modification of the plurality of video signal wirings shown in FIG. 10. FIG. 16 is an enlarged plan view showing another modification of the plurality of video signal wirings shown in FIG. 10. Each of FIG. 15 and FIG. 16 is an enlarged plan view of the part corresponding to the wiring region R4 shown in FIG. 10.

Each of the display device DSP4 shown in FIG. 15 and the display device DSP5 shown in FIG. 16 is different from the display device DSP1 shown in FIG. 10 in the following points. That is, in the display device DSP4, the wiring width W1 of each of the plurality of video signal wirings VSW in the wiring region R4 is greater than the wiring width W2 of each of the plurality of video signal wirings VSW in the wiring region R8. Further, in the display device DSP5, each of the plurality of video signal wirings VSW is meandering in the wiring region R4. The width (meander width) W3 of the meandering part of the video signal wiring VSW is greater than the wiring width W2 of each of the plurality of video signal wirings VSW in the wiring region R8.

The value of the capacitance of the capacitor shown schematically in FIG. 7 increases in proportion to the facing area between the video signal wiring VSW and the conductor pattern CCP. The display device DSP4 shown in FIG. 15 and the display device DSP5 shown in FIG. 16 are the modes in which the area of the video signal wiring VSW is increased in the wiring region R4, thereby increasing the facing area between the video signal wiring VSW and the conductor pattern CCP (see FIG. 7). By increasing the value of the coupling capacitance formed between the video signal wiring VSW and the conductor pattern CCP, it is possible to improve the noise suppression effect.

FIG. 15 and FIG. 16 each show an example of the method of increasing the facing area between the video signal wiring VSW and the conductor pattern CCP (see FIG. 7), but there are various modifications of the method of increasing the facing area in addition to those shown in FIG. 15 and FIG. 16. For example, the shape of the video signal wiring VSW may be a mesh pattern. Alternatively, the shape of the video signal line VSW may have the same shape as the conductor pattern CCP4 shown in FIG. 10.

Each of the display device DSP4 shown in FIG. 15 and the display device DSP5 shown in FIG. 16 is the same as the display device DSP1 described with reference to FIG. 1 to FIG. 10 except for the differences described above. Therefore, a duplicate description will be omitted.

A person having ordinary skill in the art can make various modifications and corrections within a range of the idea of the present invention, and it is interpreted that the modifications and corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

The present invention can be applied to a display device.

What is claimed is:

1. A display device comprising:
    a first substrate having a first side extending in a first direction and a second side opposite to the first side in a second direction perpendicular to the first direction;
    a display region between the first side and the second side in the second direction;
    a plurality of touch detection electrodes arranged in a matrix in the first direction and the second direction in the display region;
    a switch circuit region which is present between the first side and the display region in the second direction and in which a signal selection circuit is arranged;
    a peripheral wiring region which is present between the first side and the switch circuit region in the second direction and in which a plurality of peripheral wirings including a plurality of video signal wirings connected to the signal selection circuit and a plurality of touch detection wirings connected to the plurality of touch detection electrodes are arranged; and
    a terminal region which is present between the first side and the peripheral wiring region in the second direction and in which a plurality of terminals electrically connected to the plurality of peripheral wirings are arranged,
    wherein the peripheral wiring region includes:
        a first insulating layer on the first substrate;
        a first wiring layer on the first insulating layer;
        a second insulating layer which is present on the first insulating layer and covers the first wiring layer; and
        a second wiring layer on the second insulating layer,
    wherein the plurality of video signal wirings are arranged in the first wiring layer,
    wherein the plurality of touch detection wirings and a conductor pattern to which a first potential is supplied are formed in the second wiring layer,
    wherein the conductor pattern is arranged at a position overlapping a part of the plurality of video signal wirings, and is capacitively coupled to the part of the plurality of video signal wirings, and
    wherein the plurality of touch detection electrodes are formed on the second insulating layer in the display region.

2. The display device according to claim 1,
    wherein the number of the plurality of video signal wirings is greater than the number of the plurality of touch detection wirings,
    wherein the plurality of conductor patterns to which the first potential is supplied are formed in the second wiring layer,
    wherein the peripheral wiring region includes:
        a first wiring region in which the plurality of video signal wirings extend in a direction inclined with respect to each of the first direction and the second direction;
        a second wiring region which is present between the terminal region and the first wiring region in the second direction and in which the plurality of video signal wirings extend in the second direction; and
        a third wiring region which is present between the first side and the first wiring region in the second direction and in which the video signal wiring is not arranged, and
    wherein the plurality of conductor patterns include a first conductor pattern arranged so as to straddle a boundary between the third wiring region and the first wiring region.

3. The display device according to claim 2,
    wherein the plurality of conductor patterns include the plurality of first conductor patterns extending in the second direction so as to straddle the boundary between the third wiring region and the first wiring region.

4. The display device according to claim 3,
    wherein, in the third wiring region, a first potential wiring arranged along the boundary between the third wiring region and the first wiring region is arranged in the first wiring layer, and
    wherein the plurality of first conductor patterns are electrically connected to each other via the first potential wiring.

5. The display device according to claim 2,
    wherein the peripheral wiring region includes:
        a fourth wiring region, in which the plurality of touch detection wirings are arranged adjacent to each other in the second wiring layer, in the second wiring region; and
        a fifth wiring region and a sixth wiring region, in which the touch detection wiring is not arranged and which are present between the first wiring region and the terminal region in the second direction, in the second wiring region,
    wherein the fourth wiring region is present between the fifth wiring region and the sixth wiring region in the first direction, and
    wherein the plurality of conductor patterns include second conductor patterns arranged in each of the fifth wiring region and the sixth wiring region.

6. The display device according to claim 5,
    wherein the peripheral wiring region includes a seventh wiring region which is present next to the sixth wiring region in the first direction and is present between the first side and the first wiring region in the second direction and in which the video signal wiring is not arranged, and
    wherein the plurality of conductor patterns include a third conductor pattern extending in the second direction so as to straddle a boundary between the seventh wiring region and the first wiring region.

7. The display device according to claim 2,
wherein the peripheral wiring region includes:
- a fourth wiring region, in which the plurality of touch detection wirings are arranged adjacent to each other in the second wiring layer, in the second wiring region; and
- an eighth wiring region, in which the plurality of touch detection wirings extend in the second direction, in the first wiring region, and wherein the plurality of conductor patterns include a plurality of fourth conductor patterns arranged so as to straddle a boundary between the fourth wiring region and the eighth wiring region.

8. The display device according to claim 7,
wherein each of the plurality of fourth conductor patterns is electrically connected to any one of the plurality of touch detection wirings.

9. The display device according to claim 8,
wherein, in the eighth wiring region, two or more forth conductor patterns among the plurality of fourth conductor patterns are arranged between two adjacent touch detection wirings among the plurality of touch detection wirings.

10. The display device according to claim 1,
wherein the number of the plurality of video signal wirings is greater than the number of the plurality of touch detection wirings,
wherein the plurality of conductor patterns to which the first potential is supplied are formed in the second wiring layer,
wherein the peripheral wiring region includes:
- a first wiring region in which the plurality of video signal wirings extend in a direction inclined with respect to each of the first direction and the second direction;
- a second wiring region which is present between the terminal region and the first wiring region in the second direction and in which the plurality of video signal wirings extend in the second direction; and
- a ninth wiring region, in which the touch detection wiring is not arranged, in the first wiring region, and wherein the plurality of conductor patterns include a first conductor pattern arranged in the ninth wiring region.

11. The display device according to claim 10,
wherein the number of the plurality of video signal wirings is greater than the number of the plurality of touch detection wirings,
wherein the plurality of conductor patterns to which the first potential is supplied are formed in the second wiring layer,
wherein the peripheral wiring region further includes:
- an eighth wiring region, in which the plurality of touch detection wirings extend in the second direction, in the first wiring region; and
- a tenth wiring region, in which the touch detection wiring is not arranged, in the first wiring region, wherein the eighth wiring region is present between the ninth wiring region and the tenth wiring region, and
wherein the plurality of conductor patterns include a second conductor pattern arranged in the tenth wiring region.

12. The display device according to claim 1,
wherein the peripheral wiring region further includes a semiconductor film formed between the first substrate and the first wiring layer, and
wherein the semiconductor film is arranged at a position overlapping a part of the plurality of video signal wirings and is capacitively coupled to the part of the plurality of video signal wirings.

13. The display device according to claim 1,
wherein the peripheral wiring region further includes a conductor film formed between the first substrate and the first wiring layer, and
wherein the conductor film is arranged at a position overlapping a part of the plurality of video signal wirings and is capacitively coupled to the part of the plurality of video signal wirings.

* * * * *